(12) United States Patent
Cheng

(10) Patent No.: US 11,993,301 B2
(45) Date of Patent: May 28, 2024

(54) UNLOCKING DEVICE WITH PAUSE FUNCTION

(71) Applicant: UNIQUE PRODUCT & DESIGN CO., LTD., Tainan (TW)

(72) Inventor: Chih-Ching Cheng, Tainan (TW)

(73) Assignee: UNIQUE PRODUCT & DESIGN CO., LTD., Tainan (TW)

( * ) Notice: Subject to any disclaimer, the term of this patent is extended or adjusted under 35 U.S.C. 154(b) by 923 days.

(21) Appl. No.: 17/025,707

(22) Filed: Sep. 18, 2020

(65) Prior Publication Data

US 2021/0078462 A1 Mar. 18, 2021

(30) Foreign Application Priority Data

Sep. 18, 2019 (TW) .................................. 108133593

(51) Int. Cl.
*B62B 7/14* (2006.01)
*A01K 1/02* (2006.01)
(Continued)

(52) U.S. Cl.
CPC ............ *B62B 7/142* (2013.01); *A01K 1/0236* (2013.01); *B60N 2/2821* (2013.01); *B60N 2/2848* (2013.01); *E05C 3/30* (2013.01)

(58) Field of Classification Search
CPC ..... E05C 3/30; E05C 3/22; E05C 3/06; E05C 3/08; E05C 3/12; E05C 3/16; E05C 3/162;
(Continued)

(56) References Cited

U.S. PATENT DOCUMENTS

| 289,666 | A | * | 12/1883 | Lee | ........................... E05C 3/30 292/108 |
|---|---|---|---|---|---|
| 524,594 | A | * | 8/1894 | Iske | ........................... E05C 3/30 292/127 |

(Continued)

FOREIGN PATENT DOCUMENTS

| CN | 200951788 Y | 9/2007 |
|---|---|---|
| CN | 201626464 U | 11/2010 |

(Continued)

*Primary Examiner* — Christine M Mills
*Assistant Examiner* — Faria F Ahmad
(74) *Attorney, Agent, or Firm* — Muncy, Geissler, Olds & Lowe, P.C.

(57) ABSTRACT

An unlocking device with a pause function comprises a first moving member having a first protruding portion, a second moving member having a second protruding portion, and a third moving member having a third end portion and a fourth end portion. The second moving member is disposed corresponding to the first moving member. The second protruding portion is disposed cooperated with the first protruding portion. The third end portion is connected to the second moving member. When the fourth end portion of the third moving member contacts a carry body, and a first end portion of a releasing member moves along a first direction towards the housing, the releasing member drives the first moving member to move in the first direction, so the second moving member holds the position of the releasing member by the second protruding portion and the first protruding portion.

18 Claims, 31 Drawing Sheets

(51) Int. Cl.
*B60N 2/28* (2006.01)
*E05C 3/30* (2006.01)

(58) Field of Classification Search
CPC ........ E05C 19/022; E05B 63/18; E05B 63/25;
E05B 63/20; B60N 2/2821; B60N 2/2824
See application file for complete search history.

(56) References Cited

U.S. PATENT DOCUMENTS

| | | | | |
|---|---|---|---|---|
| 1,896,363 | A * | 2/1933 | Johnson | E05C 3/30 |
| | | | | 292/DIG. 19 |
| 2,313,711 | A * | 3/1943 | Jacobi | E05B 83/30 |
| | | | | 70/145 |
| 5,031,942 | A * | 7/1991 | Harrod | E05C 1/166 |
| | | | | 292/DIG. 53 |
| 5,076,622 | A * | 12/1991 | Detweiler | E05B 79/20 |
| | | | | 292/DIG. 60 |
| 5,493,099 | A * | 2/1996 | McWilliams, III | H05B 6/6417 |
| | | | | 292/124 |
| 6,848,728 | B2 * | 2/2005 | Rotondi | E05B 63/20 |
| | | | | 292/DIG. 31 |
| 7,032,973 | B2 * | 4/2006 | Reubeuze | B60N 2/2245 |
| | | | | 292/121 |
| 7,418,845 | B2 * | 9/2008 | Timothy | E05B 63/185 |
| | | | | 70/121 |
| 8,727,393 | B2 * | 5/2014 | Ruspil | E05C 1/10 |
| | | | | 292/DIG. 20 |
| 9,188,143 | B1 * | 11/2015 | Motherwell | B62J 7/04 |
| 10,794,087 | B2 * | 10/2020 | Teunis | E05B 47/0002 |
| 11,591,835 | B2 * | 2/2023 | Cheng | E05B 63/20 |
| 2006/0033343 | A1 * | 2/2006 | Xu | E05B 41/00 |
| | | | | 292/139 |
| 2006/0244270 | A1 * | 11/2006 | Rotondi | E05B 63/20 |
| | | | | 292/213 |
| 2007/0209285 | A1 * | 9/2007 | Bestler | E05B 65/0864 |
| | | | | 49/449 |
| 2009/0115204 | A1 * | 5/2009 | Rycroft | E05B 63/20 |
| | | | | 70/276 |
| 2011/0221211 | A1 * | 9/2011 | Weron | E05B 63/20 |
| | | | | 292/64 |
| 2013/0320032 | A1 * | 12/2013 | Rahilly | E05C 3/24 |
| | | | | 292/200 |
| 2014/0037371 | A1 * | 2/2014 | Mensch | B60N 2/01583 |
| | | | | 403/328 |
| 2020/0080344 | A1 * | 3/2020 | Fullenwider | E05B 9/02 |
| 2022/0290475 | A1 * | 9/2022 | Cheng | E05B 65/0811 |

FOREIGN PATENT DOCUMENTS

| | | |
|---|---|---|
| CN | 201998843 U | 10/2011 |
| CN | 204368239 U | 6/2015 |
| CN | 104999935 A | 10/2015 |
| CN | 206202399 U | 5/2017 |
| EP | 0595096 A1 | 5/1994 |
| JP | 2005231498 A | 9/2005 |
| JP | 2006089027 A | 4/2006 |

* cited by examiner

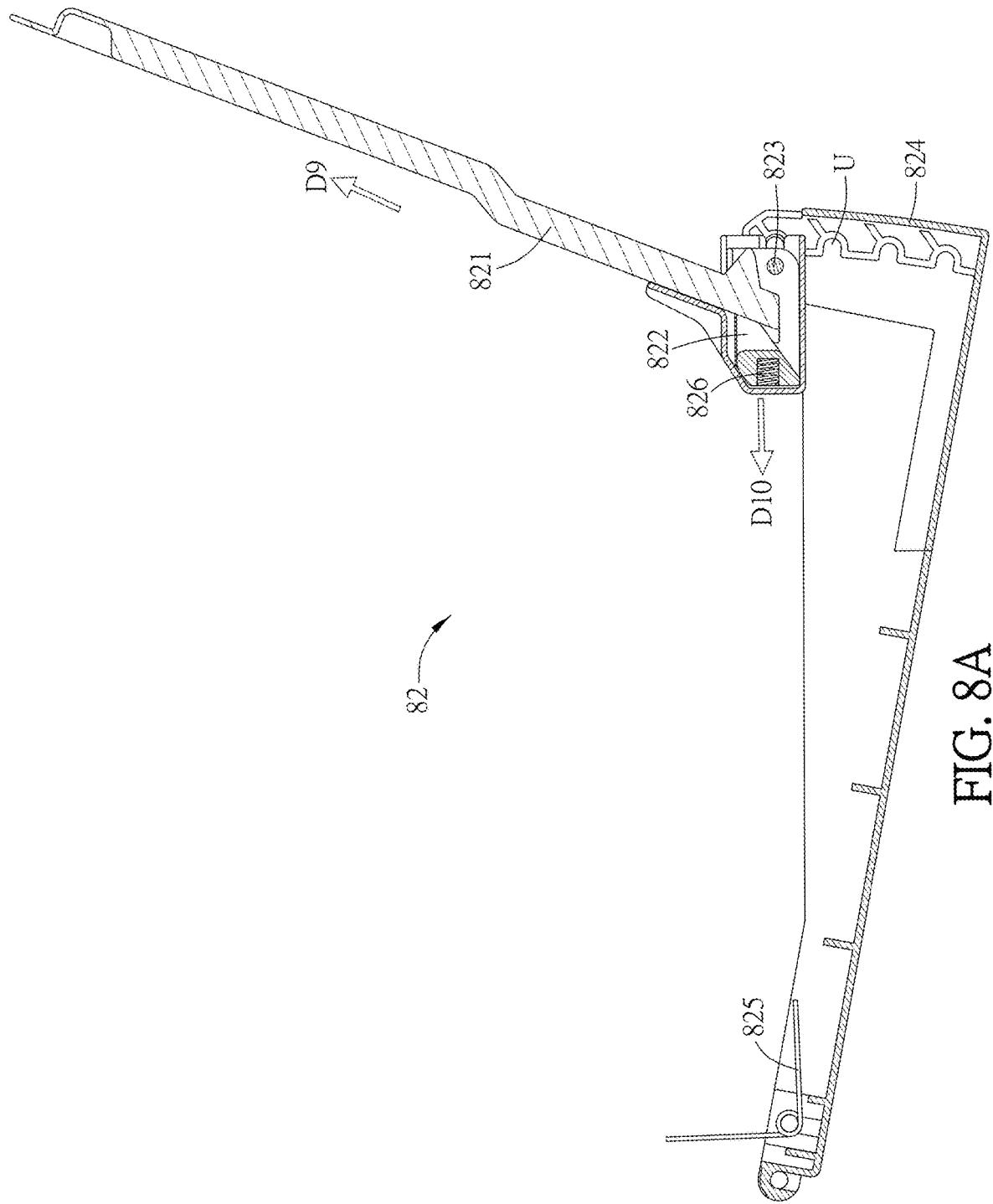

UNLOCKING DEVICE WITH PAUSE FUNCTION

CROSS REFERENCE TO RELATED APPLICATIONS

This Non-provisional application claims priority under 35 U.S.C. § 119(a) on Patent Application No(s). 108133593 filed in Taiwan, Republic of China on Sep. 18, 2019, the entire contents of which are hereby incorporated by reference.

BACKGROUND

Technology Field

The present disclosure relates to an unlocking device and, in particular, to an unlocking device with a pause function.

Description of Related Art

In general, the commercial baby safety seat has two major applications. In the first application, the baby safety seat is installed on a car seat for increasing the safety of the baby or infant in the car. In the second application, the baby safety seat is installed on the stroller, so that the user can walk with the baby in the stroller. This kind of baby safety seat can achieve the multi-purpose function.

When the baby safety seat is installed on the stroller, the user needs to press the releasing buttons at two sides by two hands at the same time before lifting the baby safety seat to detach the baby safety seat from the stroller. However, this operation is not convenient for the user who also carries other stuffs.

SUMMARY

An objective of this disclosure is to provide an unlocking device with a pause function that can be applied to, for example, a baby safety seat. The unlocking device of this disclosure has a pause function after the releasing member is pressed, so that the user does not need to press the releasing members at two sides by two hands at the same time before lifting the baby safety seat, thereby improving the utility convenience.

To achieve the above, the present disclosure provides an unlocking device with a pause function, which is cooperated with a carry body and comprises a housing, a releasing member, a first moving member, a second moving member and a third moving member. The releasing member is disposed in the housing, and the releasing member comprises a first end portion and a second end portion. The first moving member is disposed on the releasing member, and the first moving member comprises a first protruding portion. The second moving member is disposed in the housing and disposed corresponding to the first moving member. The second moving member comprises a second protruding portion, and the second protruding portion is disposed cooperated with the first protruding portion. The third moving member is disposed in the housing. The third moving member comprises a third end portion and a fourth end portion, and the third end portion is connected to the second moving member. When the fourth end portion of the third moving member contacts the carry body, and the first end portion of the releasing member moves along a first direction towards the housing, the releasing member drives the first moving member to move in the first direction, so that the second moving member holds a position of the releasing member by the second protruding portion and the first protruding portion.

In one embodiment, the carry body comprises a fixing rod, and the unlocking device further comprises a locking member disposed in the housing and disposed corresponding to the fixing rod. The second end portion of the releasing member is connected to the locking member. When the fourth end portion of the third moving member contacts the carry body and the releasing member moves along the first direction, the second end portion of the releasing member drives the locking member to rotate and to be detached from the fixing rod.

In one embodiment, the locking member comprises a slant surface facing toward the fixing rod and disposed corresponding to the fixing rod.

In one embodiment, the locking member comprises a restrict slot, the release member has a restrict portion disposed at the second end portion, and the restrict portion is located in the restrict slot.

In one embodiment, when the releasing member moves, the locking member is moved correspondingly through the restrict slot and the restrict portion so as to detach the locking member from the fixing rod or to engage the locking member to the fixing rod.

In one embodiment, each of the first protruding portion and the second protruding portion has a triangular structure.

In one embodiment, the first protruding portion has a first slant surface, the second protruding portion has a second slant surface, and the first slant surface faces toward the second slant surface.

In one embodiment, the unlocking device further comprises a first elastic member, and the releasing member further comprises a recess. The first moving member and the first elastic member are disposed in the recess, one end of the first elastic member contacts the first moving member, and another end of the first elastic member contacts a side wall of the recess. When the release member moves along the first direction, the first elastic member drives the first moving member to move, so that the first protruding portion engages with the second protruding portion.

In one embodiment, the first elastic member drives the first moving member to move in a second direction, and the second direction is perpendicular to the first direction.

In one embodiment, the second moving member further comprises a restrict slot, the third moving member has a restrict portion disposed at the third end portion, and the restrict portion is located in the restrict slot.

In one embodiment, the restrict portion limits a moving direction of the restrict slot, so that the moving direction of the second moving member is parallel to a second direction, and the second direction is parallel to the first direction.

In one embodiment, the unlocking further comprises a second elastic member disposed in the housing, and one end of the second elastic member contacts the third moving member. When the fourth end portion of the third moving member leaves the carry body, the second elastic member drives the third moving member to move along the first direction, so that the second protruding portion is detached from the first protruding portion, and the second direction is perpendicular to the first direction.

In one embodiment, when the fourth end portion of the third moving member does not contact the carry body, the fourth end portion protrudes from the housing through the second elastic member.

In one embodiment, the unlocking device further comprises a third elastic member disposed in the housing, and one end of the third elastic member contacts the releasing member. When the fourth end portion of the third moving member is detached from the carry body, the third elastic member drives the releasing member in a direction opposite to the first direction.

In one embodiment, the unlocking further comprises a position indicating member disposed in the housing and connected to the releasing member. When the releasing member moves, the position indicating member is moved correspondingly.

In one embodiment, the unlocking device is applied to a baby safety seat, a baby cradle, a pet cradle, a shopping basket, a storage basket, or a storage box.

In one embodiment, the carry body comprises a stroller, a base, or a wagon.

As mentioned above, in the unlocking device with a pause function of this disclosure, the first moving member is disposed on the releasing member and comprises a first protruding portion, the second moving member is disposed corresponding to the first moving member and comprises a second protruding portion disposed cooperated with the first protruding portion, and the third moving member is connected to the second moving member. When the fourth end portion of the third moving member contacts the carry body, and the first end portion of the releasing member moves along a first direction towards the housing, the releasing member drives the first moving member to move in the first direction, so that the second moving member holds a position of the releasing member by the second protruding portion and the first protruding portion. Accordingly, when the unlocking device is applied to, for example, a baby safety seat, the unlocking device can provide a pause function after the releasing member is pressed. Therefore, the user does not need to press the releasing members at two sides by two hands while lifting the baby safety seat at the same time, thereby improving the utility convenience.

BRIEF DESCRIPTION OF THE DRAWINGS

The disclosure will become more fully understood from the detailed description and accompanying drawings, which are given for illustration only, and thus are not limitative of the present disclosure, and wherein:

FIGS. 8A and 8B are schematic diagrams showing the angle adjustment mechanism of the base according to an embodiment of this disclosure;

DETAILED DESCRIPTION OF THE DISCLOSURE

The present disclosure will be apparent from the following detailed description, which proceeds with reference to the accompanying drawings, wherein the same references relate to the same elements.

The unlocking device with a pause function of this disclosure can be applied to, for example but not limited to, a safety seat, so that the safety seat can be installed on a carry body through the unlocking device. This disclosure is not limited thereto. In different embodiments, the unlocking device with a pause function can be applied to, for example, a cradle, a pet basket, a shopping basket, a storage basket, a storage box, or any object with a storage function.

In the following embodiments, the carry body can be, for example but not limited to, a stroller. In different embodiments, the carry body can also be a base, a wagon, or any carry object capable of supporting the safety seat. In addition, in different embodiments, the unlocking device can be applied to different objects, which can utilize the unlocking device for providing the pause function, and this disclosure is not limited.

Figure 1A:
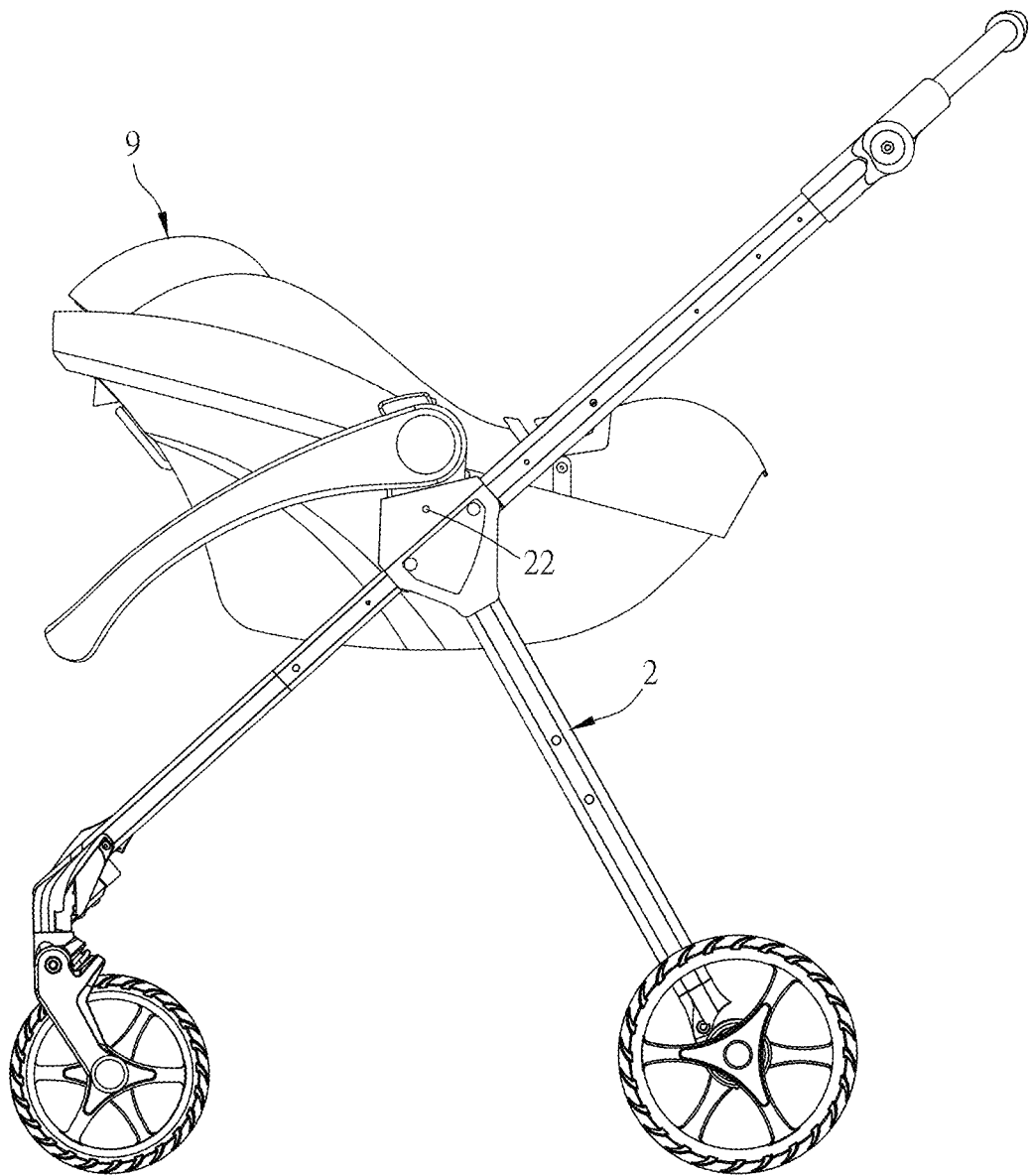
FIG. 1A is a schematic diagram showing an assembled status of a safety seat and a carry body according to an embodiment of this disclosure.
Figure 1B:
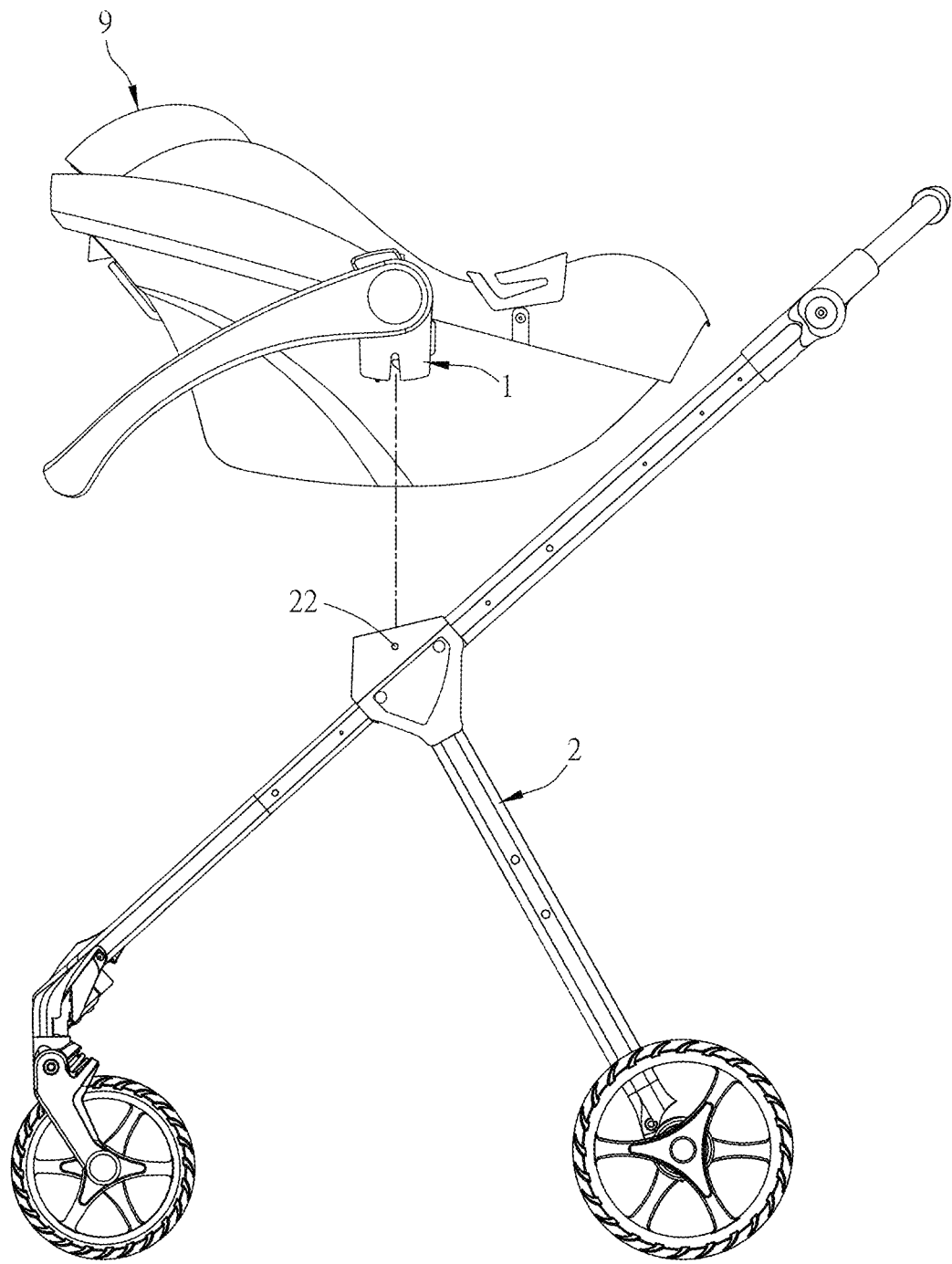
FIG. 1B is a schematic diagram showing a disassembled status of the safety seat and the carry body of FIG. 1A.

FIG. 1A is a schematic diagram showing an assembled status of a safety seat and a carry body according to an embodiment of this disclosure, and FIG. 1B is a schematic diagram showing a disassembled status of the safety seat and the carry body of FIG. 1A.

Referring to FIGS. 1A and 1B, a safety seat 9 is disposed on a carry body 2. In this embodiment, two unlocking devices 1 with a pause function are configured at two sides of the safety seat 9, respectively. The safety seat 9 can be installed on the carry body 2 through the unlocking devices 1. When the unlocking device 1 is enabled (unlocked), the safety seat 9 can be detached from the carry body 2.

The specific structure and the technical details of the pause function of the unlocking device 1 will be further described with reference to FIGS. 2A to 2D. FIGS. 2A to 2D are schematic diagrams showing the cooperation operations of the unlocking device and the carry body according to an embodiment of this disclosure.

Figure 2A:
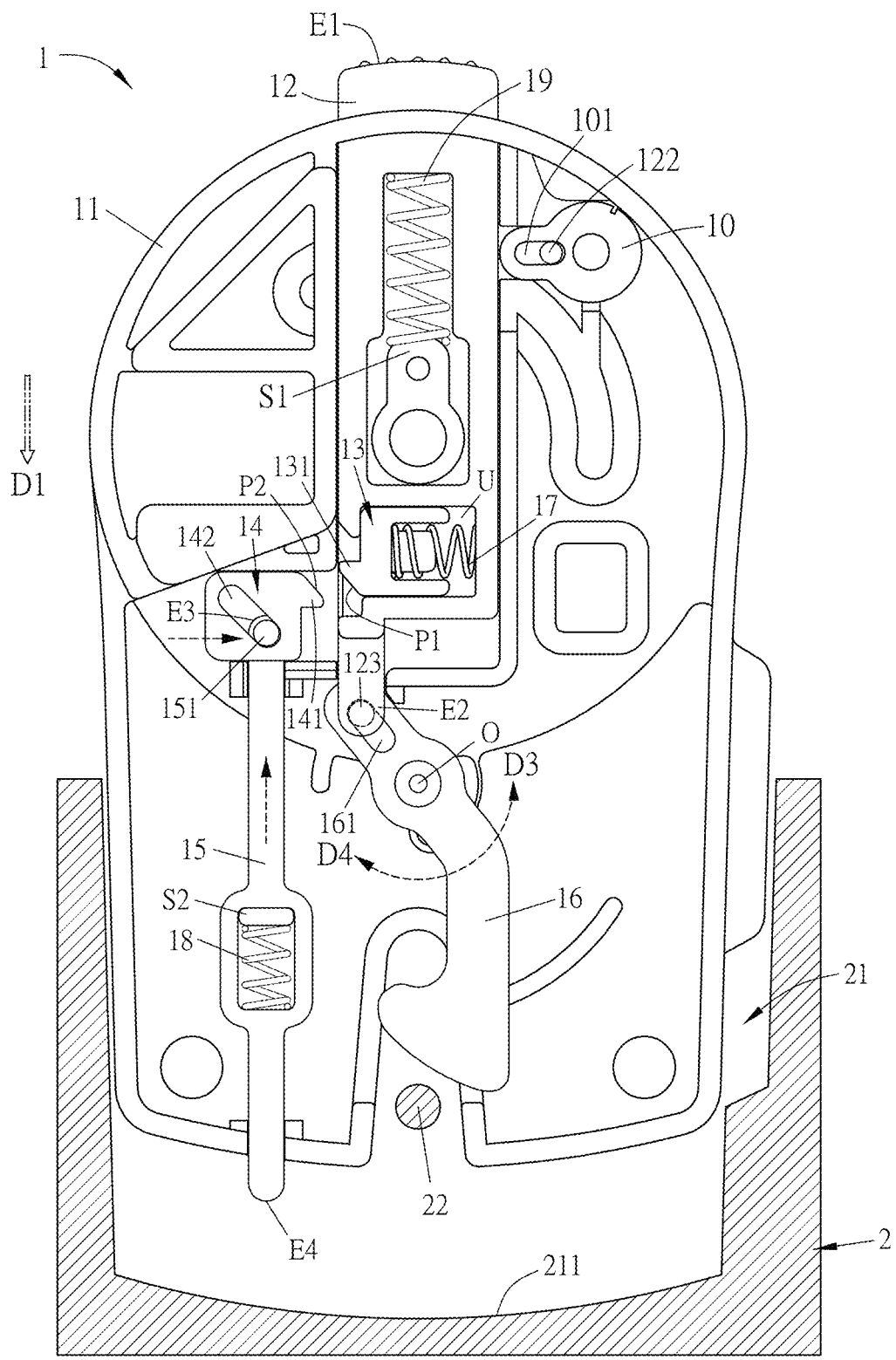
FIGS. 2A to 2D are schematic diagrams showing the cooperation operations of the unlocking device and the carry body according to an embodiment of this disclosure.
Figure 2B:
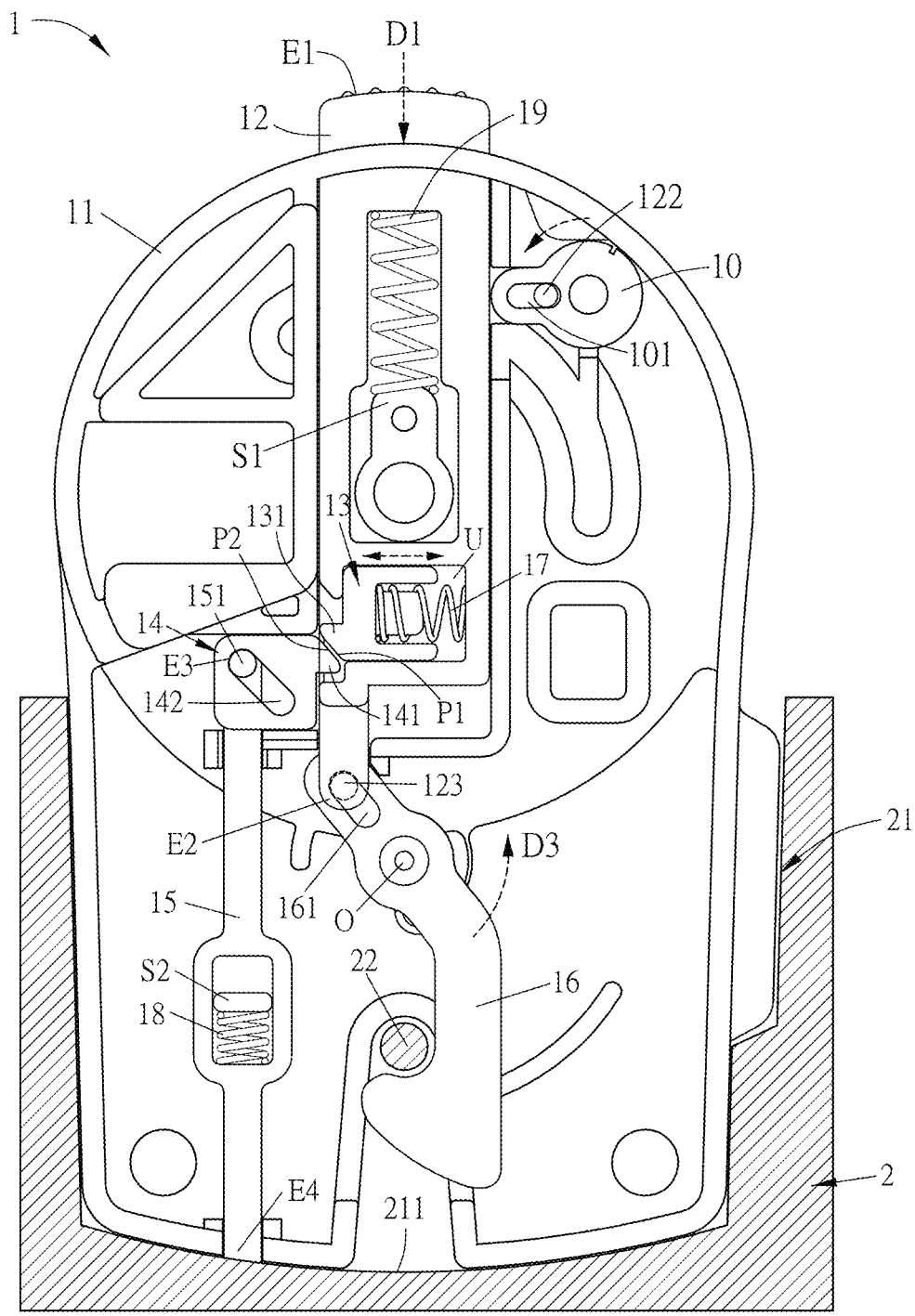

As shown in FIGS. 2A and 2B, the carry body 2 comprises a groove 21, and the unlocking device 1 is disposed inside the groove 21. When the unlocking device 1 is disposed in the groove 21 and contacts the bottom portion 211 of the groove 21, the safety seat 9 and the carry body 2 are in an assembled status.

The unlocking device 1 comprises a housing 11, a releasing member 12, a first moving member 13, a second moving member 14, and a third moving member 15. In addition, the unlocking device 1 further comprises a locking member 16, a first elastic member 17, a second elastic member 18, a third elastic member 19, and a position indicating member 10. To be noted, there are four directions defined in the drawings of this embodiment, including a first direction D1 (FIG. 2B), a second direction D2 (FIG. 2C), a third direction D3 and a fourth direction D4 (FIG. 2A). The first direction D1 is perpendicular to the second direction D2. The first direction D1 is a direction from top to bottom in FIG. 2B (i.e., a direction from the first end portion E1 of the releasing member 12 to the housing 11). The second direction D2 is a direction from right to left in FIG. 2C (i.e., a direction toward the left side of the drawing). The third direction D3 is a counterclockwise direction in FIG. 2A, and the fourth direction D4 is a clockwise direction in FIG. 2A.

As shown in FIG. 2A, the releasing member 12 is disposed in the housing 11, and the releasing member 12 comprises a first end portion E1 and a second end portion E2. In this embodiment, the first end portion E1 and the second end portion E2 are located at two opposite ends of the releasing member 12. The first end portion E1 of the releasing member 12 can protrude beyond the housing 11, and the second end portion E2 of the releasing member 12 is located inside the housing 11. In addition, the third elastic member 19 is disposed in the housing 11. One end of the third elastic member 19 contacts the releasing member 12, and the other end thereof contacts a stop member S1 (the stop member S1 is disposed in the housing 11). Accordingly, the elastic force of the third elastic member 19 can provide a pushing force on the releasing member 12 in a direction opposite to the first direction D1 (a direction from bottom to top in FIG. 2A).

The first moving member 13 is disposed on the releasing member 12, and the first moving member 13 comprises a first protruding portion 131. In this embodiment, the releasing member 12 further comprises a recess U, and the first moving member 13 and the first elastic member 17 are disposed in the recess U. One end of the first elastic member 17 contacts the first moving member 13, and another end thereof contacts a side wall of the recess U. Accordingly, the elastic force of the first elastic member 17 can provide a pushing force on the first moving member 13 in the second direction D2.

The second moving member 14 is disposed in the housing 11 and disposed corresponding to the first moving member 13. In this embodiment, the second moving member 14 comprises a second protruding portion 141, and the second protruding portion 141 is disposed cooperated with the first protruding portion 131. Each of the first protruding portion 131 and the second protruding portion 141 of this embodiment is a triangular structure. As shown in FIG. 2A, the first protruding portion 131 has a first slant surface P1, the second protruding portion 141 has a second slant surface P2, and the first slant surface P1 faces toward the second slant surface P2.

The third moving member 15 is disposed in the housing 11, and the third moving member 15 comprises a third end portion E3 and a fourth end portion E4. The fourth end portion E4 of the third moving member 15 can protrude beyond the housing 11, and the third end portion E3 thereof is located inside the housing 11 and connected to the second moving member 14. In this embodiment, the second moving member 14 further comprises a restrict slot 142 (first restrict slot), and the third moving member 15 has a restrict portion 151 (first restrict portion) disposed at the third end portion E3. The restrict portion 151 is located in the restrict slot 142, so that the position of the restrict portion 151 of the third moving member 15 can be restricted within the restrict slot 142 of the second moving member 14. As shown in FIG. 2A, when the third moving member 15 moves upwardly (in a direction opposite the first direction D1), the second moving member 14 can be correspondingly moved in a direction opposite to the second direction D2 (in a direction toward the right side). Alternatively, when the third moving member 15 moves downwardly (in the first direction D1), the second moving member 14 can be correspondingly moved in the second direction D2 (in a direction toward the left side).

The locking member 16 is disposed in the housing 11, and the second end portion E2 of the releasing member 12 is connected to the locking member 16. In addition, the carry body 2 can further comprise a fixing rod 22, and the locking member 16 is disposed corresponding to the fixing rod 22. In this embodiment, the locking member 16 comprises a slant surface (a third slant surface 162), which faces toward the fixing rod 22 and is disposed corresponding to the fixing rod 22. In addition, the locking member 16 further comprises a restrict slot 161 (second restrict slot), and the second end portion E2 of the releasing member 12 is configured with a restrict portion 123 (second restrict portion), which is located in the restrict slot 161. Accordingly, when the releasing member 12 moves, the locking member 16 can be driven to move according to the linking movement of the restrict slot 161 and the restrict portion 123. In more detailed, the locking member 16 is rotated in counterclockwise (in the third direction D3) about the rotation axis O and thus releases the fixing rod 22. Alternatively, the locking member 16 can be rotated in clockwise (in the fourth direction D4) for engaging with the fixing rod 22. Specifically, when the releasing member 12 moves downwardly, the locking member 16 can be rotated in counterclockwise (in the third direction D3) about the rotation axis O for releasing the fixing rod 22; when the releasing member 12 moves upwardly, the locking member 16 can be rotated in clockwise (in the fourth direction D4) about the rotation axis O for engaging with the fixing rod 22.

The detailed operation of the unlocking device, while installing the safety seat on a stroller, will be described hereinafter.

As shown in FIGS. 2A and 2B, when the unlocking device 1 moves downwardly and is installed in the groove 21 of the carry body 2, the fourth end portion E4 of the third moving member 15 will contact the bottom portion 211 of the carry body 2, and the third moving member 15 can be pushed and moved upwardly (FIG. 2A). Meanwhile, the second moving member 14 will be moved toward the right side due to the configuration of the restrict slot 142 (referring to FIG. 2B). At the same time, as the unlocking device 1 is moved downwardly and inserted into the groove 21, the third slant surface 162 located at the bottom of the locking member 16 (FIG. 2D) will contact the fixing rod 22, so that the third slant surface 162 can slide through the fixing rod 22 so as to rotate the locking member 16 in the counterclockwise direction (i.e., the third direction D3) about the rotation axis O. When the top of the third protruding portion 163 of the locking member 16 moves over the fixing rod 22, the locking member 16 will rotate in the clockwise direction (the fourth direction D4) about the rotation axis O until the locking member 16 hooks the fixing rod 22. When the locking member 16 rotates in the counterclockwise direction (the third direction D3), the releasing member 12 can be moved downwardly due to the linking movement of the restrict slot 161 and the restrict portion 123, and the third elastic member 19 will be compressed at the same time. When the locking member 16 rotates in the clockwise direction (the fourth direction D4), the elastic force provided by the third elastic member 19 can move the releasing member 12 upwardly as shown in FIG. 2B. Accordingly, when the locking member 16 hooks or engages with the fixing rod 22, the safety seat (the unlocking device) can be firmly installed on the stroller (the carry body 2).

The detailed operation of the pause function of the unlocking device, while uninstalling the safety seat (the unlocking device) from the stroller (the carry body 2), will be described hereinafter.

To be noted, the conventional unlocking device does not have the pause function. Thus, when the releasing member is pressed, the locking member will be moved in the counterclockwise direction and then be detached from the fixing rod. If the user cannot press two releasing members by two hands and lift the safety seat at the same time, the releasing member will be moved back due to the elastic force of the third elastic member, and the locking member will be moved in the clockwise direction for locking the fixing rod. Then, the user cannot lift the safety seat.

Figure 2C:
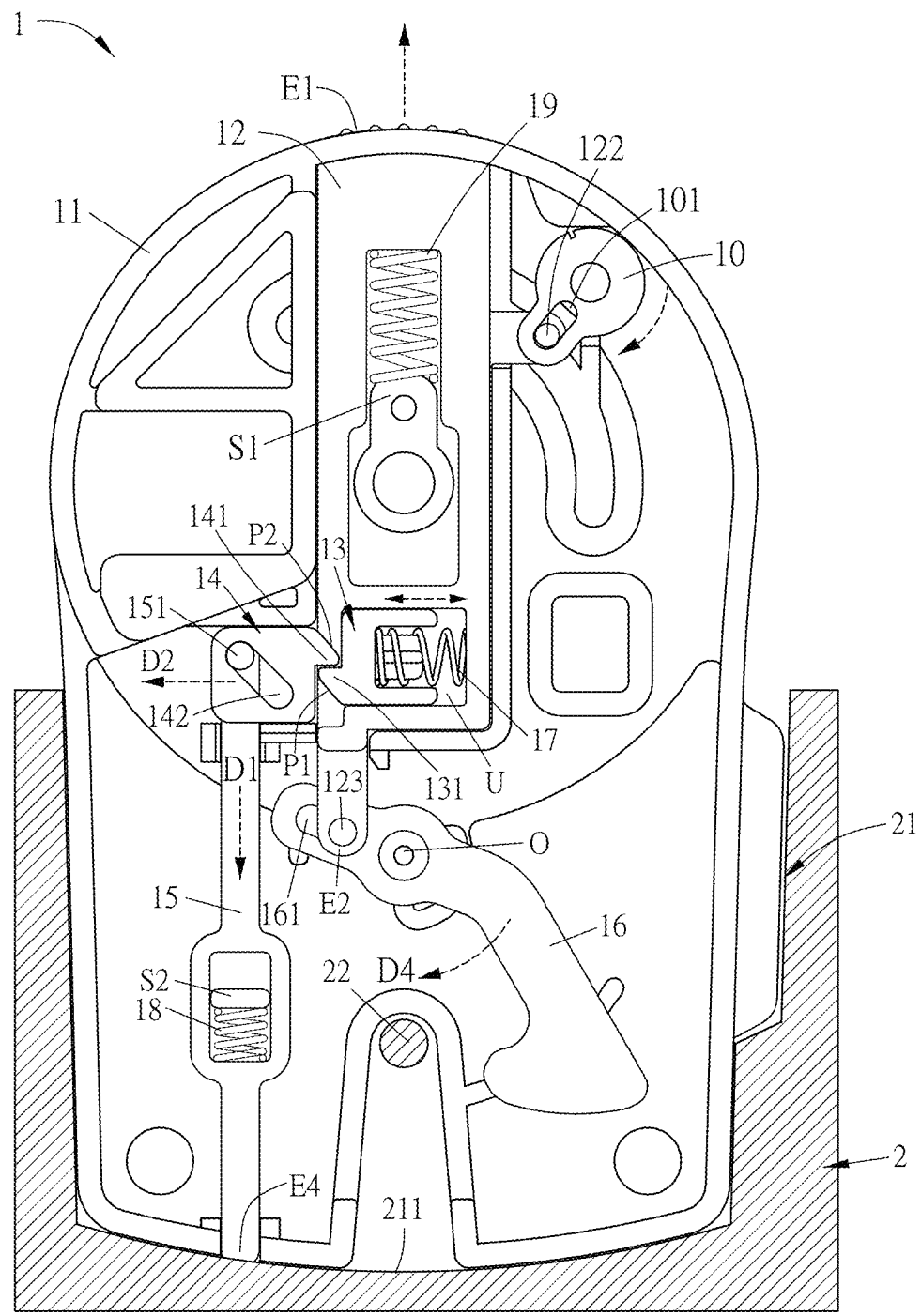

In this embodiment, as shown in FIGS. 2B and 2C, when the safety seat is installed on the stroller, the fourth end portion E4 of the third moving member 15 contacts the carry body 2, and the locking member 16 is engaged with the fixing rod 22. In order to detach the safety seat (the unlocking device) from the stroller (the carry body 2), the user can press the releasing member(s) 12. In more detailed, the first end portion E1 of the releasing member 12 is moved in the first direction D1 (downwardly) toward the housing 11. Meanwhile, the releasing member 12 can drive the first moving member 13 to move in the first direction D1, and the second end portion E2 of the releasing member 12 can drive the locking member 16 to rotate in the third direction D3 (the counterclockwise direction) for releasing the fixing rod 22. At the same time, due to the configuration of the first slant surface P1 of the first protruding portion 131 and the second slant surface P2 of the second protruding portion 141, the first moving member 13 moving in the first direction D1 can be pushed toward the direction opposite to the second direction D2, thereby compressing the first elastic member 17. When the tip of the first protruding portion 131 moves over the tip of the second protruding portion 141, the elastic force of the compressed first elastic member 17 can push the first moving member 13 to move in the second direction D2. As shown in FIG. 2C, the first protruding portion 131 and the second protruding portion 141 can engage with each other. Accordingly, the releasing member 12 cannot be moved back (upwardly) by the elastic force of the third elastic member 19. Of course, the locking member 16 cannot be rotated in the clockwise direction (the fourth direction D4) for hooking the fixing rod 22 again (stay in unlock status). As mentioned above, the pause function of this embodiment can be carried out by utilizing the second protruding portion 141 of the second moving member 14 to engage with the first protruding portion 131 of the first moving member 13, thereby holding the position of the releasing member 12. Thus, the locking member 16 does not hook the fixing rod 22 so as to provide a temporary unlocking function. As shown in FIG. 2C, the unlocking device 1 stays in the unlocking status, so that the user can lift the safety seat any time.

As mentioned above, the "pause function" of this embodiment means that when the releasing member 12 is pressed for enabling the locking member 16 to release the fixing rod 22, the user does not have to lift the safety seat while keeping pressing the releasing member(s) 12, and the unlocking device can temporarily stay in the unlocking status (the locking member 16 keeps in the status of releasing the fixing rod 22). In practice, the user can press one releasing member 12 firstly and then press the other releasing member 12 later, or press the releasing members 12 simultaneously and then move the hands away, and then the user can lift the safety seat. Of course, the user can press the releasing members 12 and lift the safety seat at the same time. Accordingly, the unlocking device 1 can be kept in the temporary pause status after the releasing member 12 is pressed. Therefore, the user does not need to press the releasing members 12 at two sides by two hands while lifting the baby safety seat at the same time, thereby improving the utility convenience.

Figure 2D:
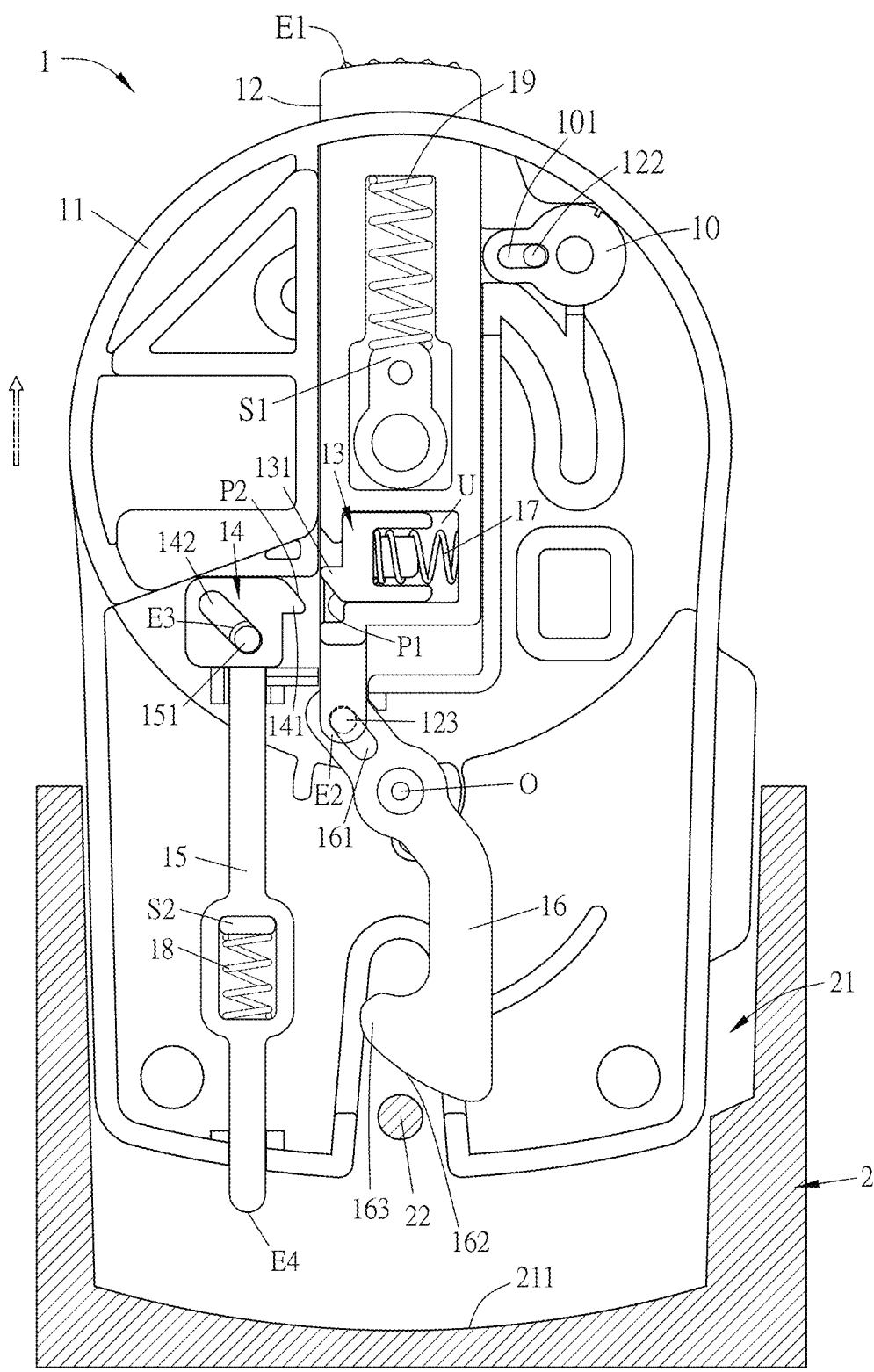

Referring to FIG. 2C, the second elastic member 18 is disposed in the housing 11. One end of the second elastic member 18 contacts the third moving member 15, and the other end of the second elastic member 18 is connected to a stop portion S2. When the fourth end portion E4 of the third moving member 15 contacts the bottom portion 211 of the groove 21, the second elastic member 18 is compressed. Accordingly, when the safety seat is lifted and the unlocking device leaves the carry body 2, the fourth end portion E4 of the third moving member 15 leaves the bottom portion 211 of the groove 21, and the elastic force of the second elastic member 18 can push the third moving member 15 to move downwardly (in the first direction D1). Meanwhile, due to the configuration of the restrict slot 142, the third moving member 15 moving downwardly can push the second moving member 14 to move toward the left side (in the second direction D2), thereby releasing the second protruding portion 141 from the first protruding portion 131. As shown in FIG. 2D, since the first protruding portion 131 is released from the second protruding portion 141, the elastic force of the third elastic member 19 can push the releasing member 12 to move upwardly (in the first direction D1). In other words, the releasing member 12 can be moved back. Thus, the locking member 16 can be rotated in the clockwise direction to move back. In this embodiment, the first elastic member 17, the second elastic member 18 and the third elastic member 19 are springs for example, but this disclosure is not limited thereto. In different embodiments, the first elastic member 17, the second elastic member 18 or the third elastic member 19 can be a flat spring or any object that can provide the elastic force.

Referring to FIGS. 2B and 2C again, the unlocking device 1 of this embodiment further comprises a position indicating member 10, which is disposed in the housing 11 and connected to the releasing member 12. When the releasing member 12 moves, the position indicating member 10 can be carried to rotate, thereby indicating the unlocking status or the locking status by, for example, color. In this embodiment, the position indicating member 10 comprises a restrict slot 101 (a third restrict slot), and the restrict portion 122 (the third restrict portion) of the releasing member 12 is disposed in the restrict slot 101. As shown in FIG. 2B, when the releasing member 12 is pressed, the position indicating member 10 will rotate in the third direction D3 (the counterclockwise direction) due to the linking movement of the restrict portion 122 and the restrict slot 101. In addition, as shown in FIG. 2C, when the releasing member 12 moves back upwardly, the position indicating member 10 will rotate in the fourth direction D4 (the clockwise direction). Specifically, when the locking member 16 releases the fixing rod 22 (the unlocking device 1 is in the unlocking status), the position indicating member 10 shows, for example, red while the user views the housing 11 from outside. On the contrary, when the locking member 16 hooks the fixing rod 22 (the unlocking device 1 is in the locking status), the position indicating member 10 shows, for example, green while the user views the housing 11 from outside.

Figure 3A:
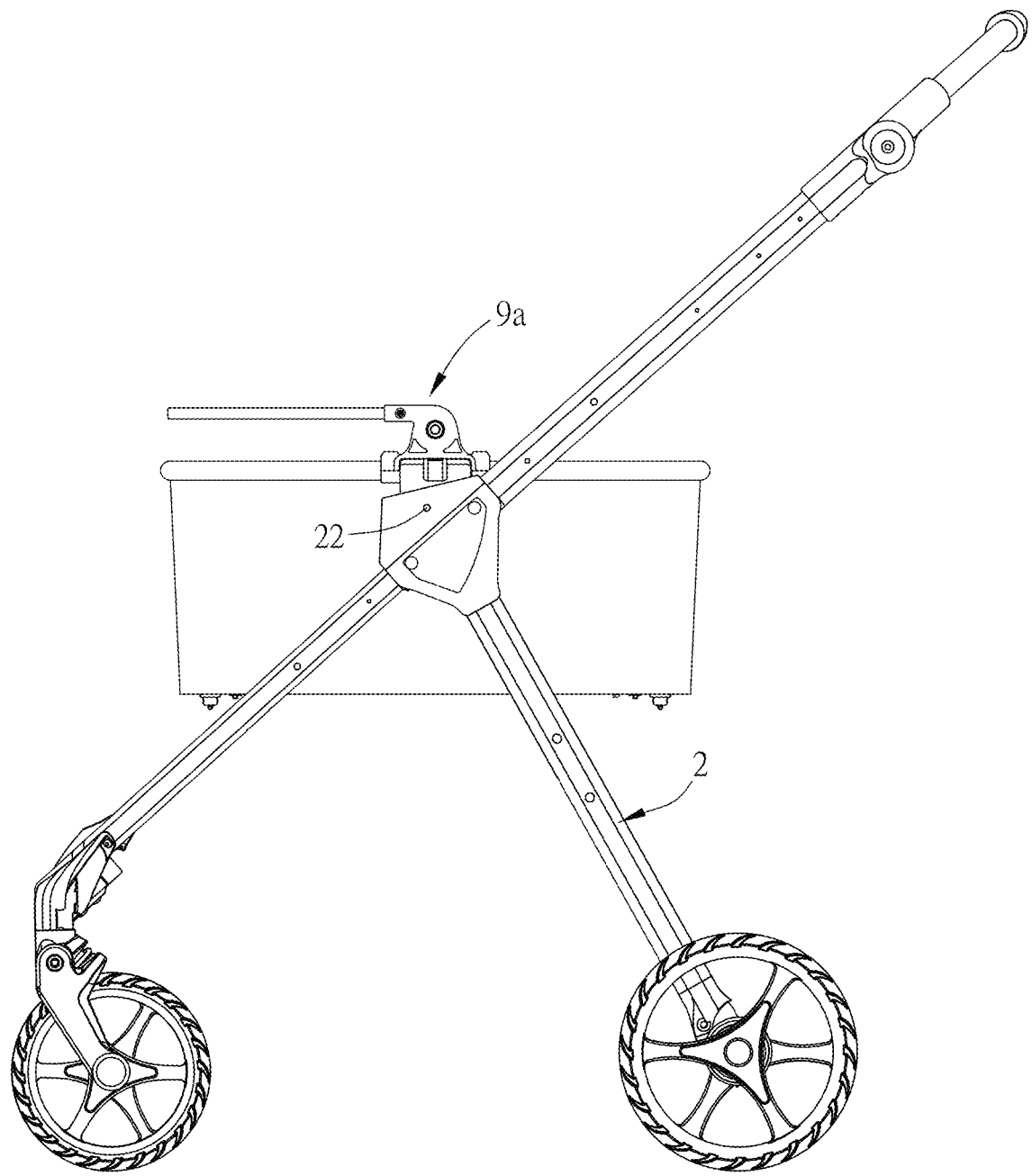
FIGS. 3A and 3B are schematic diagrams showing the assembled status and the disassembled status of a pet basket and a carry body according to an embodiment of this disclosure.
Figure 3B:
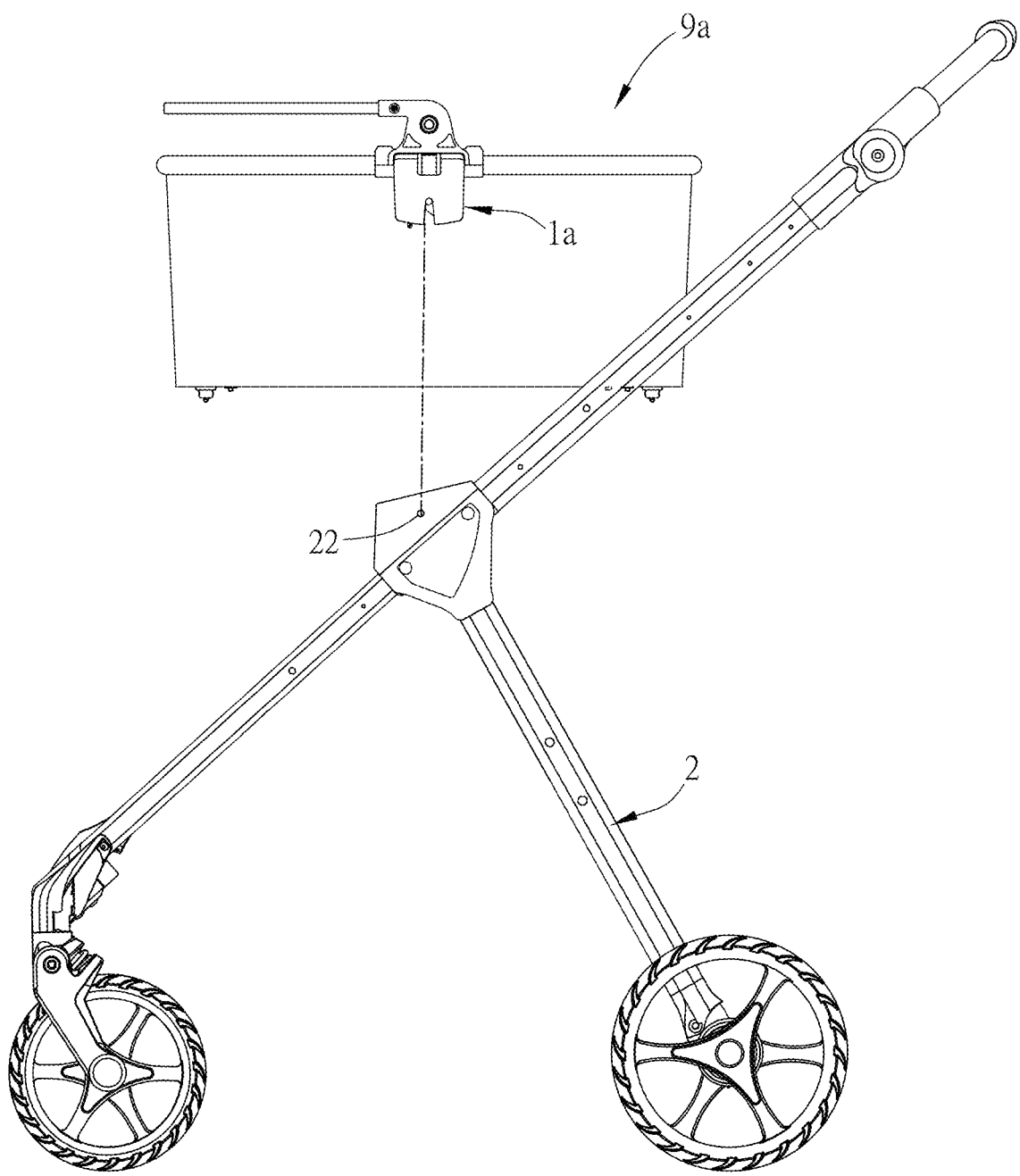
Figure 3C:
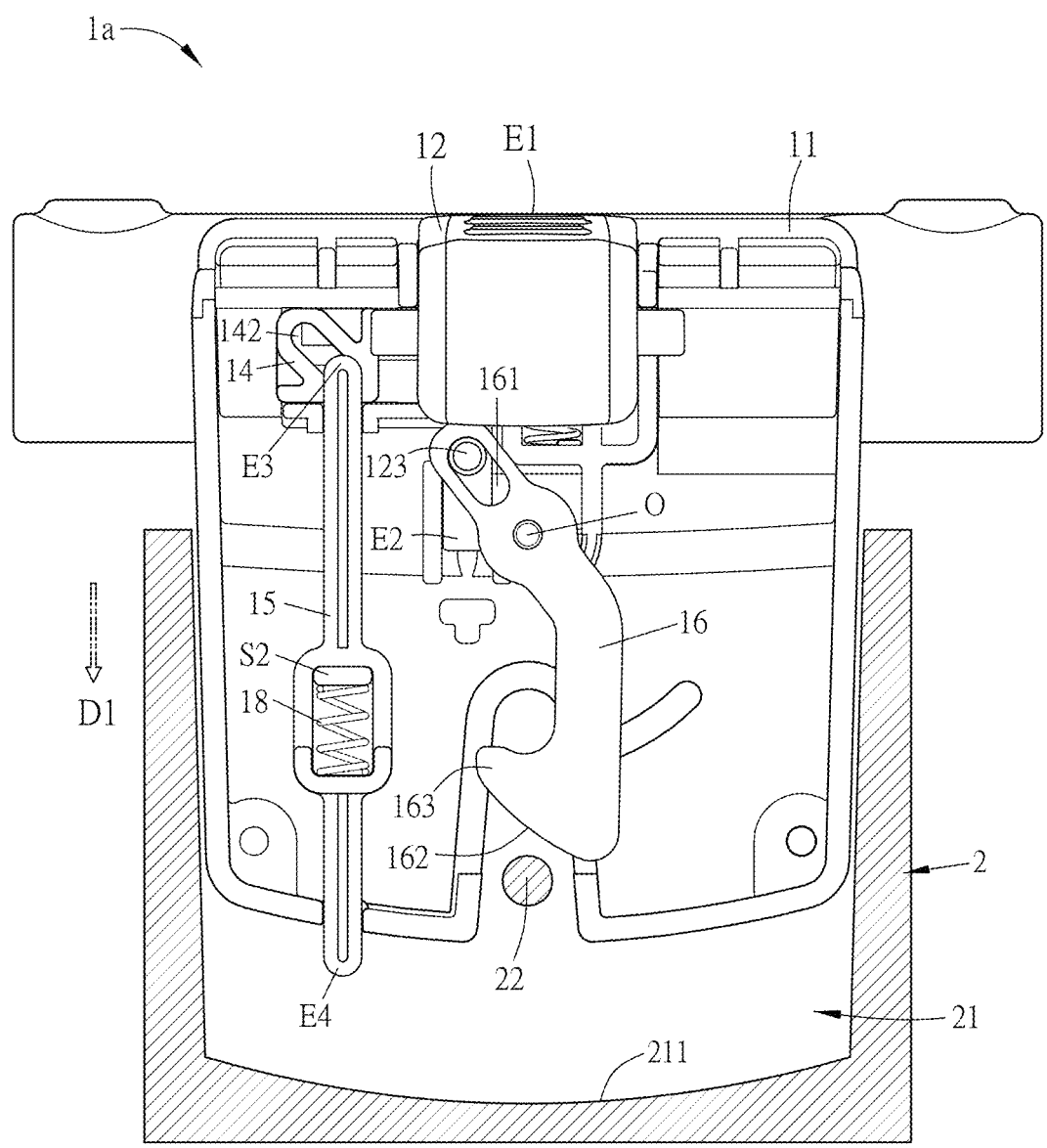
FIGS. 3C and 3D are schematic diagrams showing the cooperation operations of the unlocking device and the carry body according to another embodiment of this disclosure.
Figure 3D:
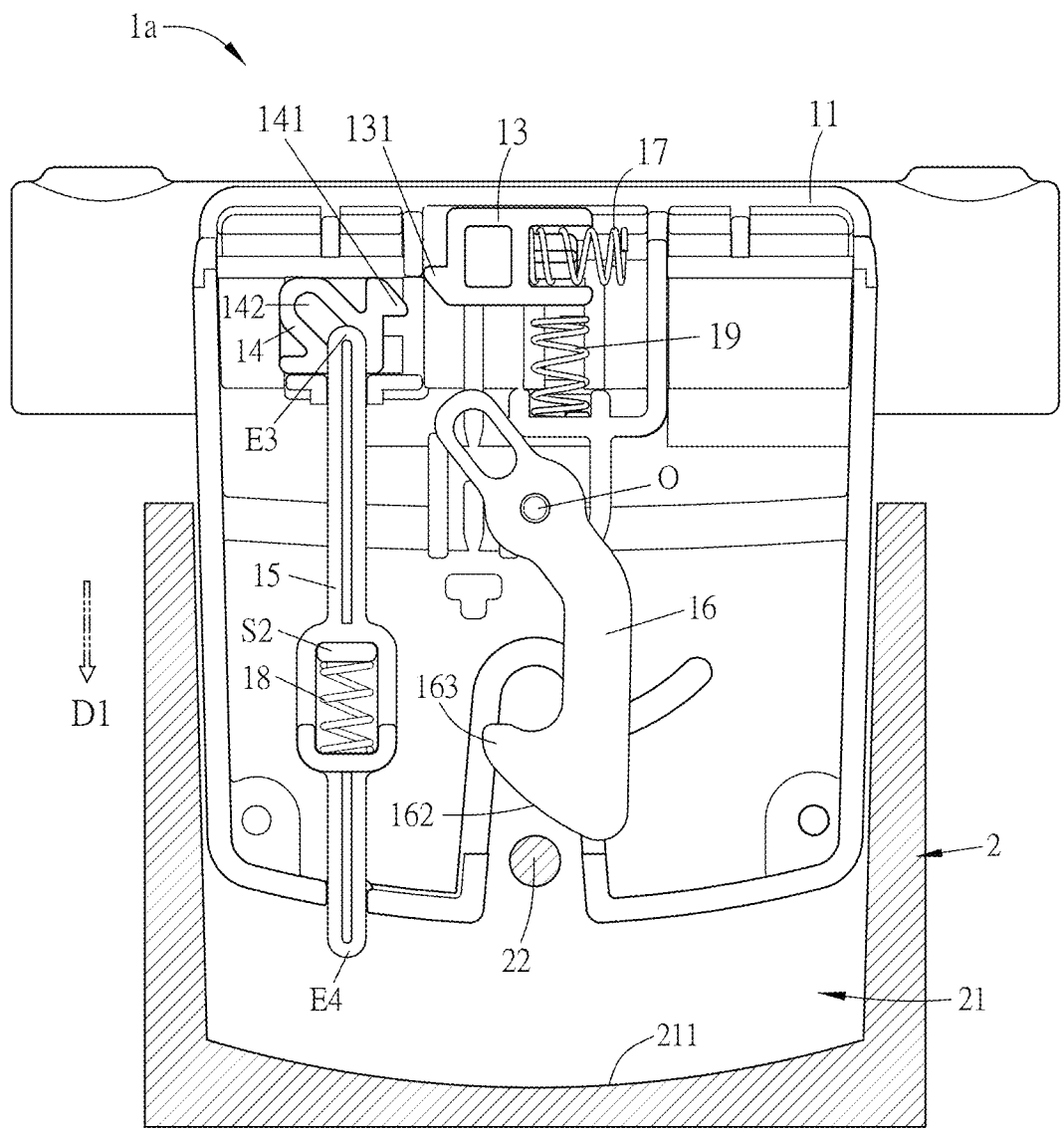
Figure 3E:
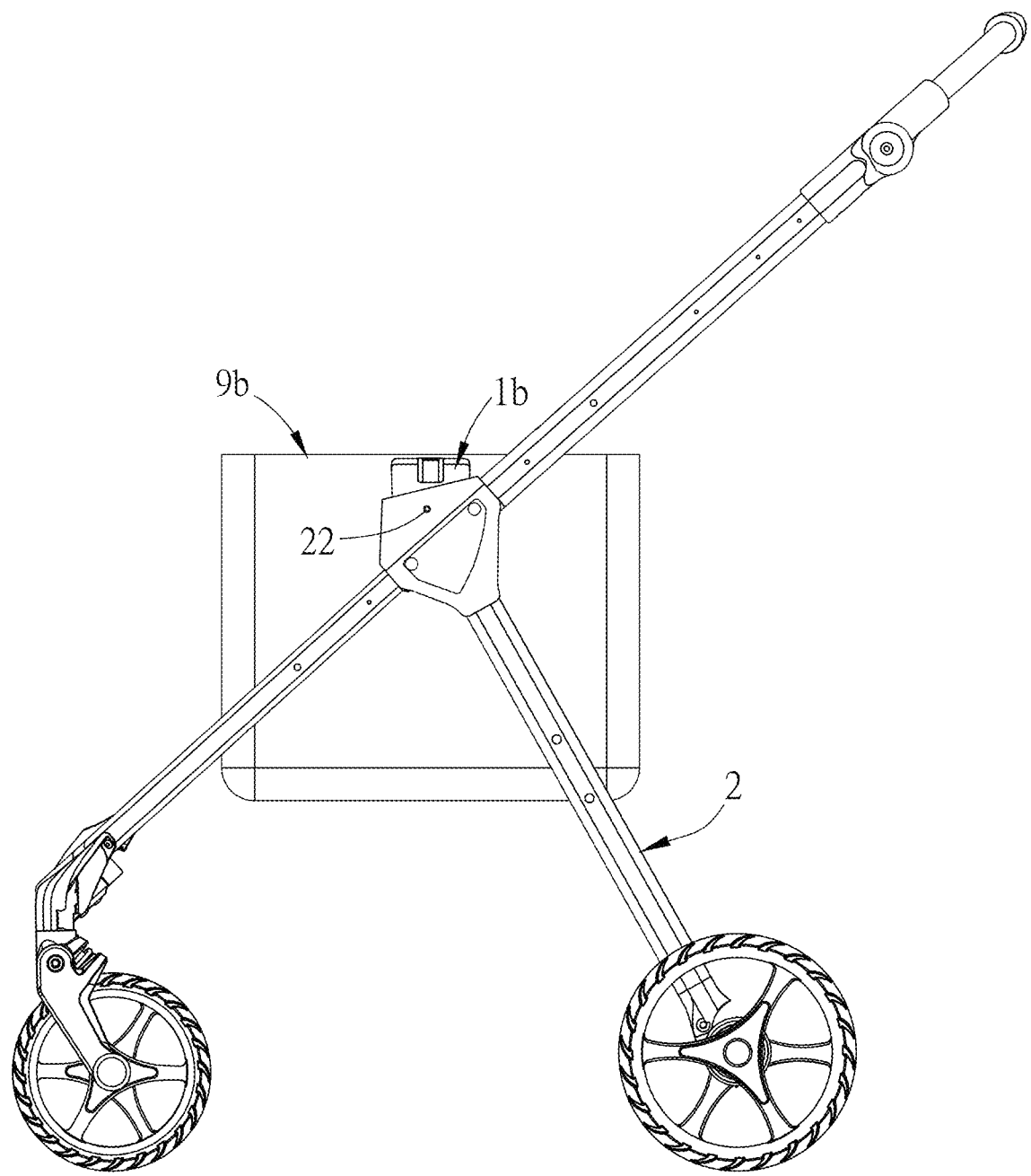
FIGS. 3E and 3F are schematic diagrams showing the assembled status and the disassembled status of a storage basket and a carry body according to an embodiment of this disclosure.
Figure 3F:
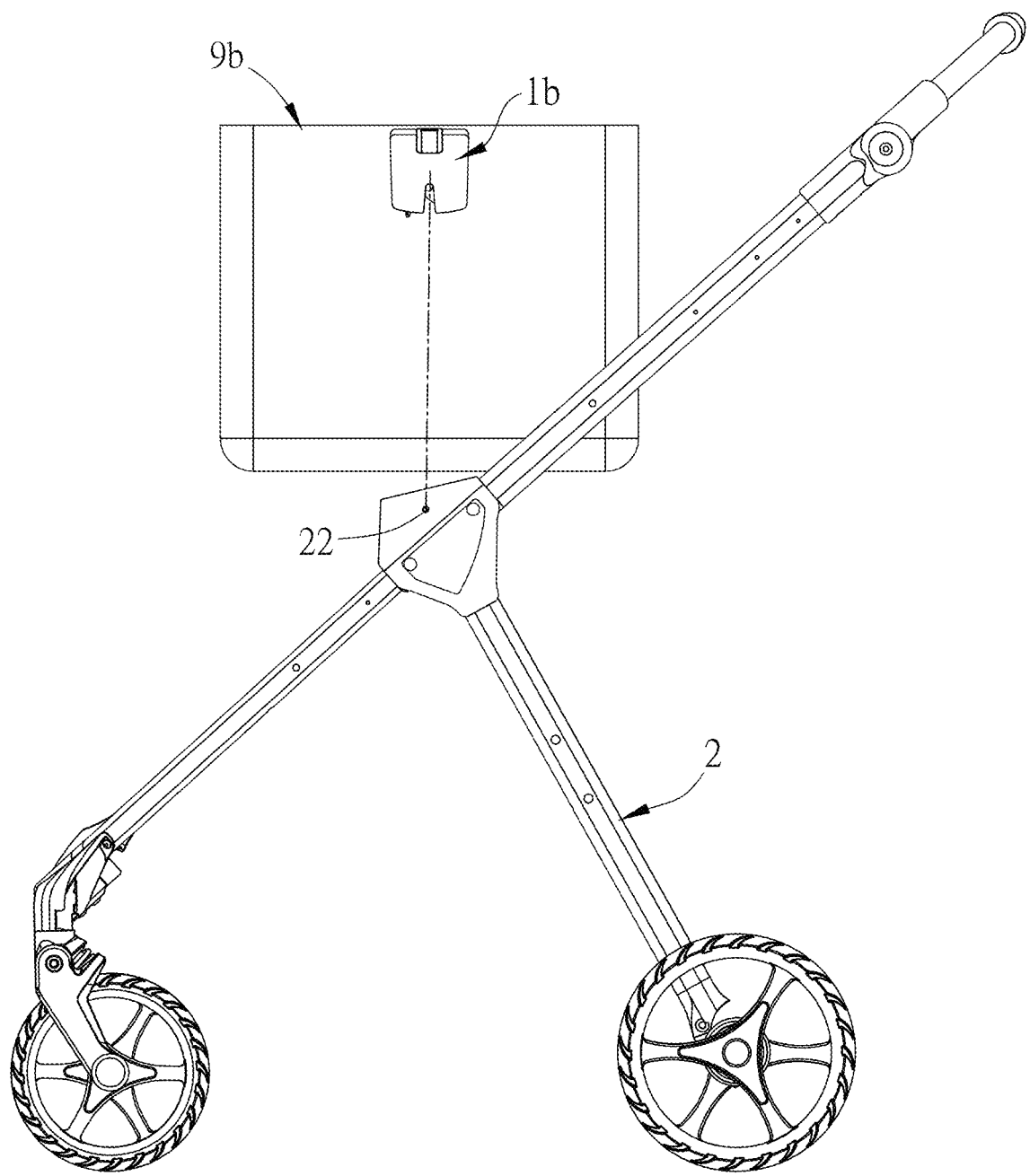

FIGS. 3A and 3B are schematic diagrams showing the assembled status and the disassembled status of a pet basket and a carry body according to an embodiment of this disclosure, FIGS. 3C and 3D are schematic diagrams showing the cooperation operations of the unlocking device and the carry body according to another embodiment of this disclosure, and FIGS. 3E and 3F are schematic diagrams showing the assembled status and the disassembled status of a storage basket and a carry body according to an embodiment of this disclosure.

As shown in FIGS. 3A and 3B, the unlocking device 1a of this embodiment is applied to a pet basket 9a. Specifically, the pet basket 9a can be installed on a carry body 2, and two unlocking devices 1a with a pause function are configured at two sides of the pet basket 9a, respectively. The pet basket 9a can be installed on the carry body 2 through the unlocking devices 1a. When the unlocking device 1a is unlocked, the pet basket 9a can be detached from the carry body 2. As shown in FIGS. 3C and 3D, the detailed technical contents of the components in the unlocking device 1a can be referred to the same components in the above-mentioned unlocking device 1, so the detailed descriptions thereof will be omitted.

In this embodiment, when the releasing member 12 of the unlocking device 1a is pressed in the first direction D1 for enabling the locking member 16 to release the fixing rod 22, the user does not have to lift the pet basket 9a while keeping pressing the releasing member(s) 12, and the unlocking device 1a can temporarily stay in the unlocking status according to the structure design (the locking member 16 keeps in the status of releasing the fixing rod 22). In practice, the user can press one releasing member 12 firstly and then press the other releasing member 12 later, or press the releasing members 12 simultaneously and then move the hands away, and then the user can lift the pet basket 9a. Accordingly, the unlocking device 1a can be kept in the temporary pause status after the releasing member 12 is pressed. Therefore, the user does not need to press the releasing members 12 at two sides by two hands while lifting the pet basket 9a at the same time, thereby improving the utility convenience.

As shown in FIGS. 3E and 3F, the unlocking device 1b of this embodiment is applied to a storage basket 9b. The structure of the unlocking device 1b is the same as that of the unlocking device 1a, so the detailed description of the unlocking device 1b can be referred to the unlocking device 1a.

Figure 4A:
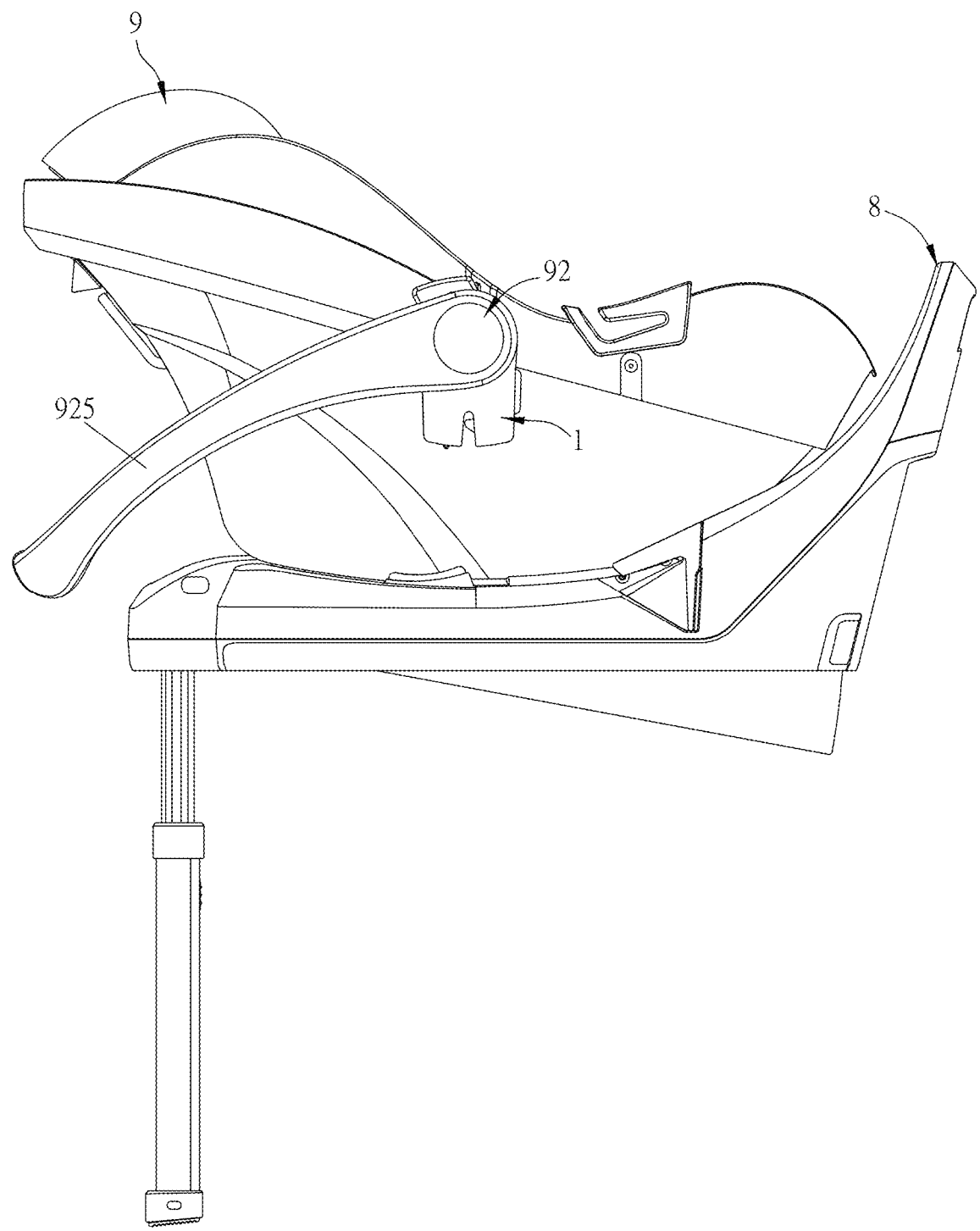
FIGS. 4A and 4B are schematic diagrams showing the assembled status and the disassembled status of a safety seat and a base according to an embodiment of this disclosure.
Figure 4B:
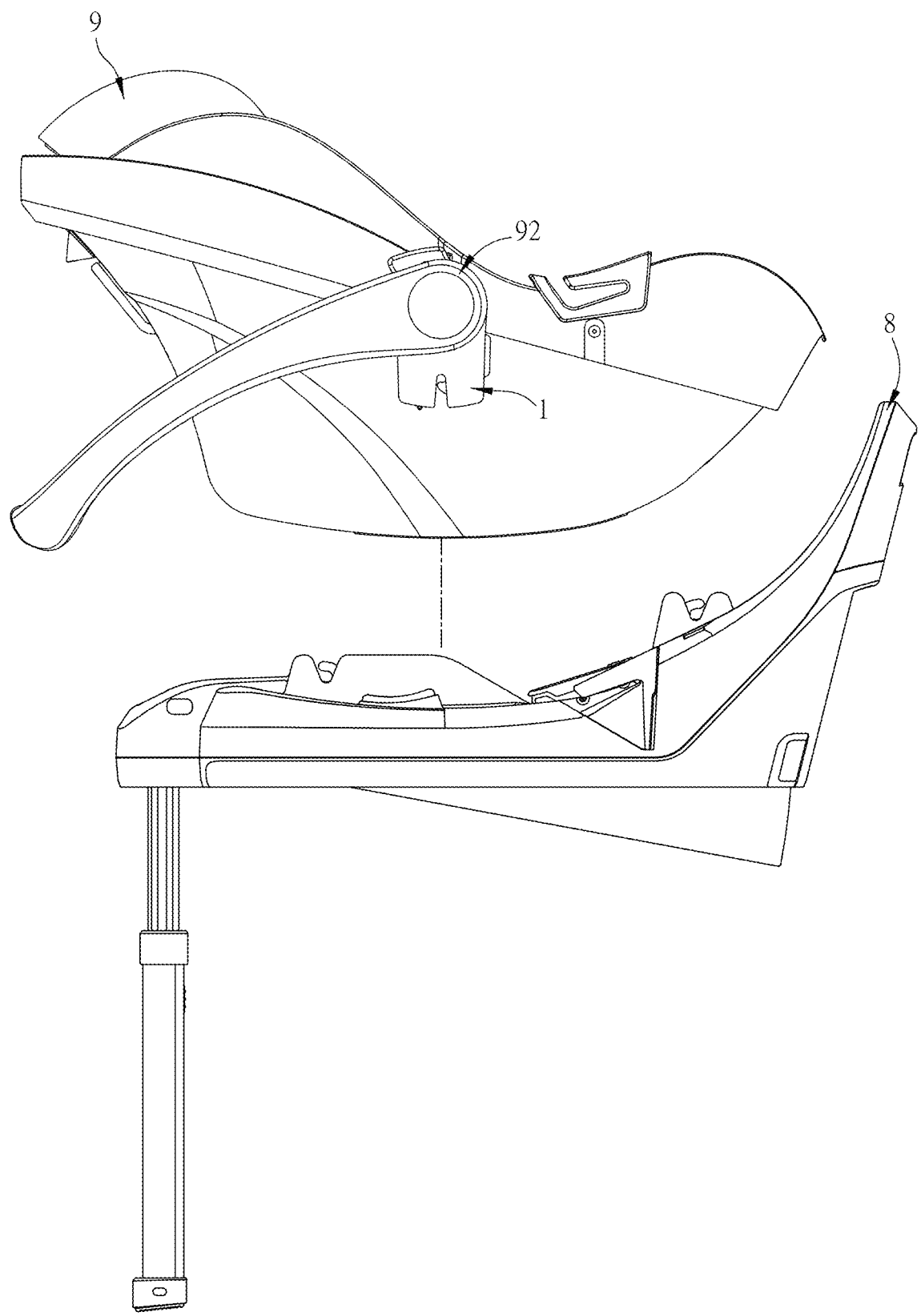

FIGS. 4A and 4B are schematic diagrams showing the assembled status and the disassembled status of a safety seat and a base according to an embodiment of this disclosure. As shown in FIGS. 4A and 4B, the safety seat 9 can be disposed on a base, which is installed on a car seat. The structures and the technical contents of the safety seat 9 and the base 8 of this embodiment will be described hereinafter with reference to the related drawings.

Figure 5A:
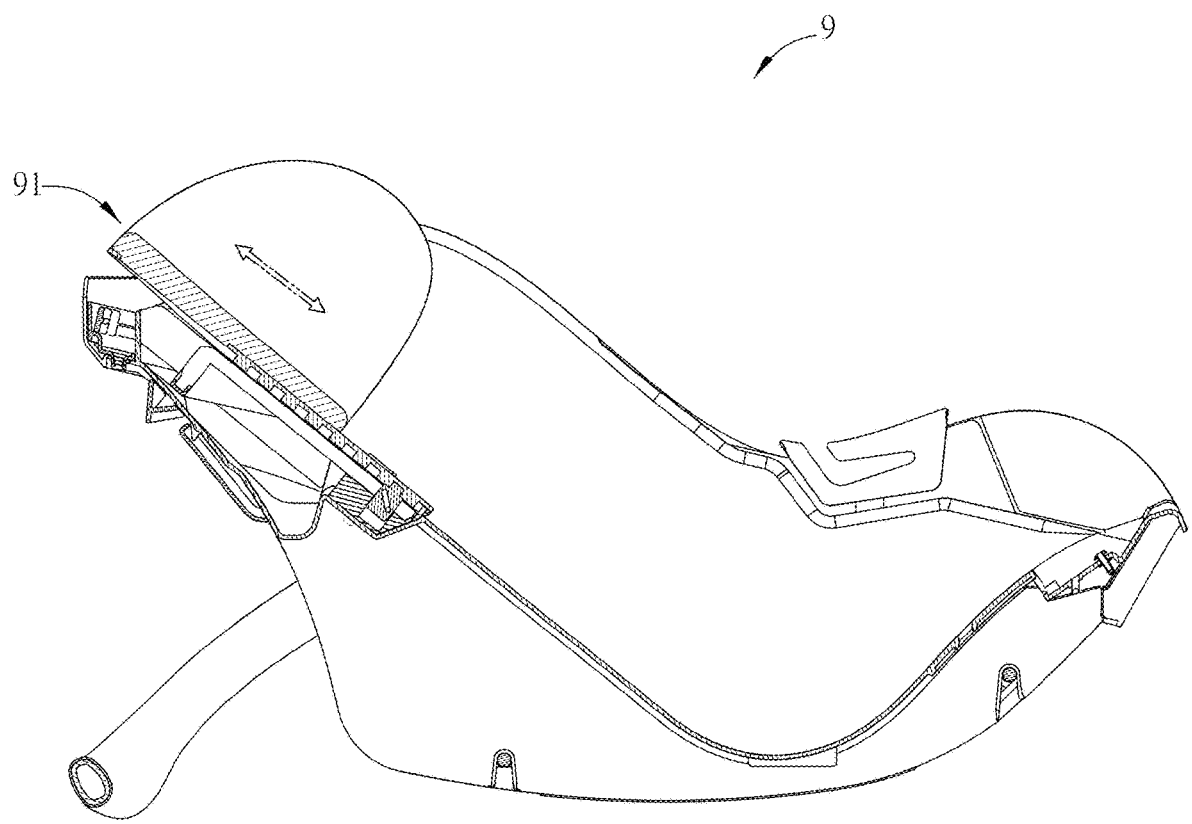
FIGS. 5A to 5C are schematic diagrams showing the pillow adjustment structure of the safety seat according to an embodiment of this disclosure.
Figure 5B:
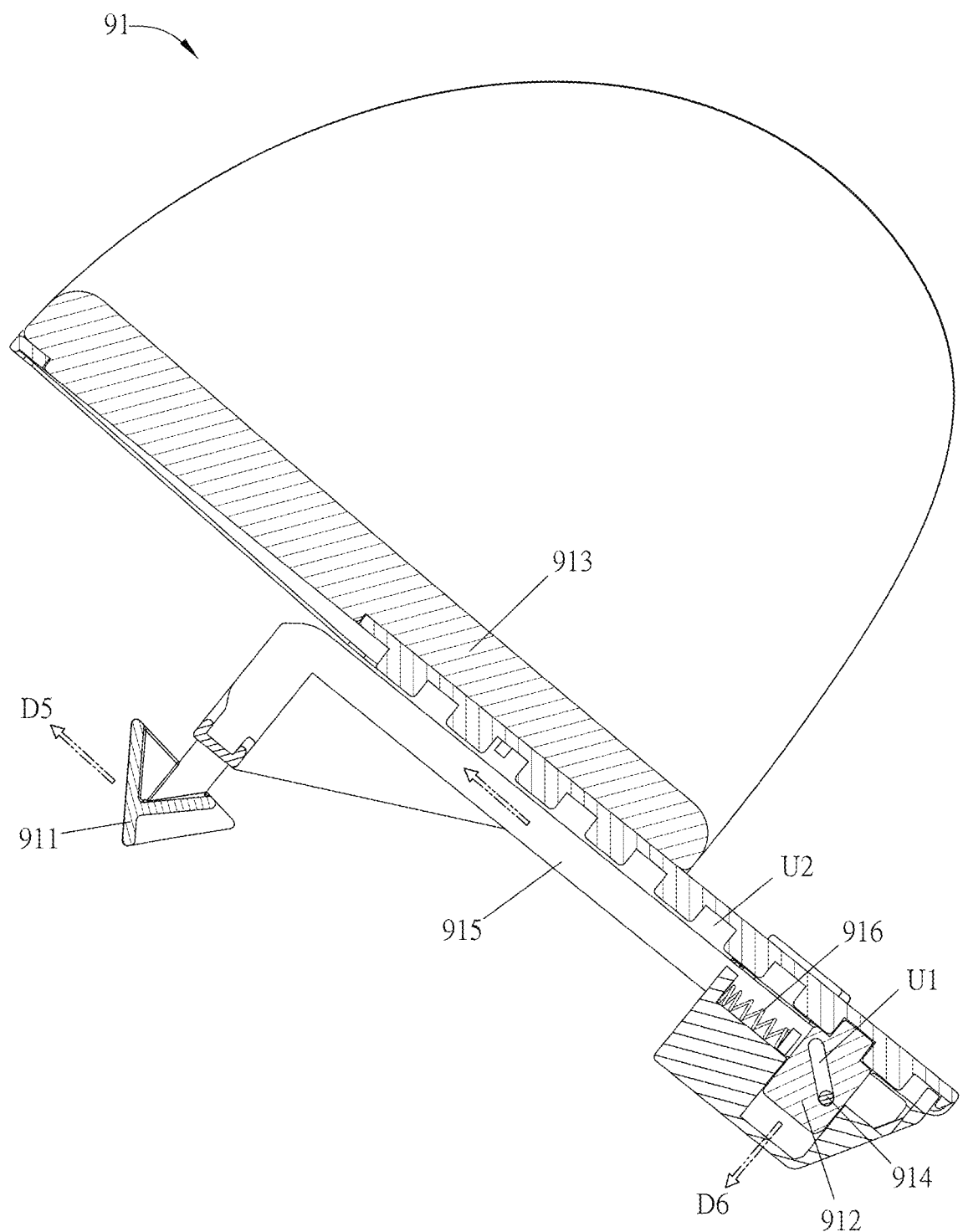
Figure 5C:
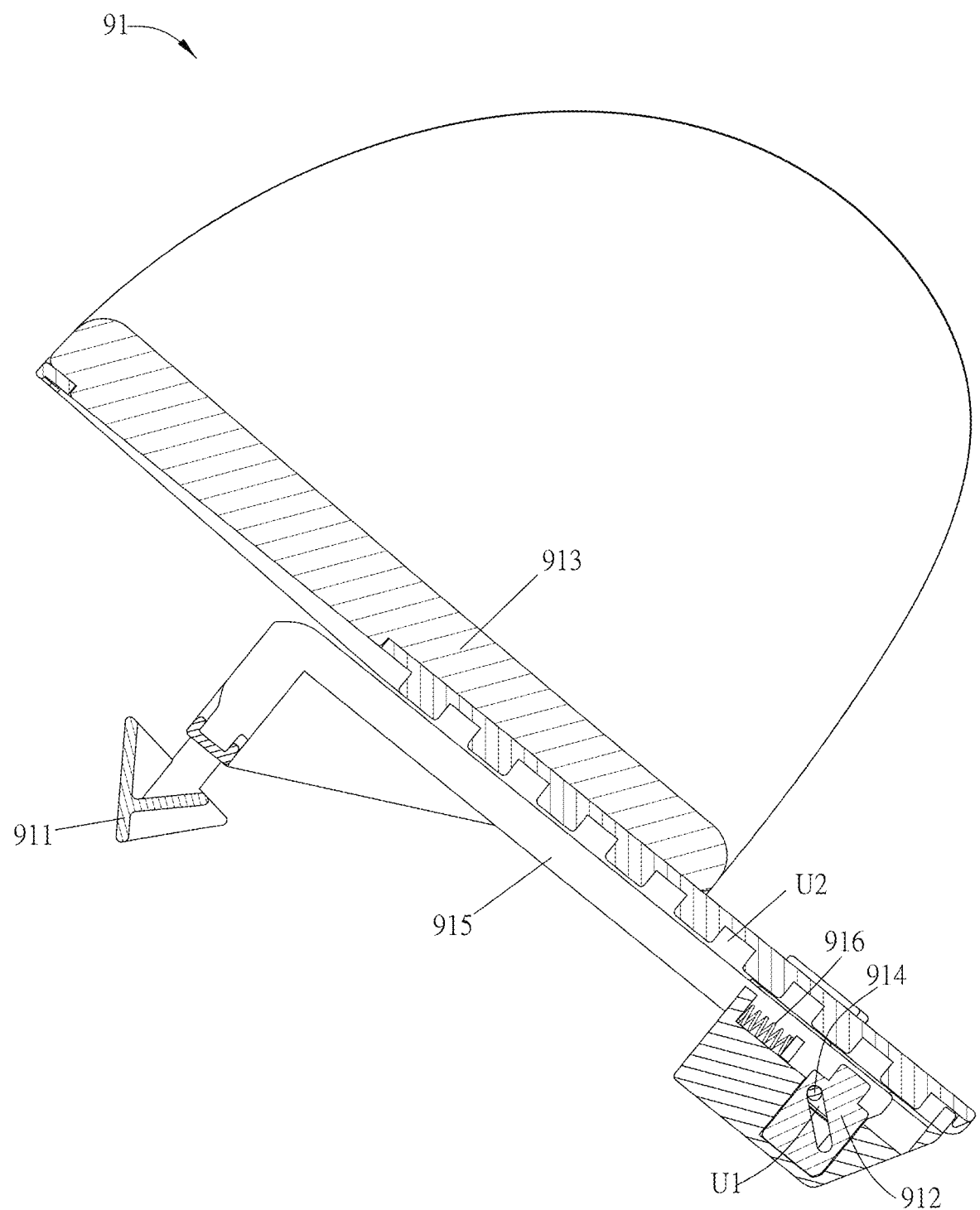

FIGS. 5A to 5C are schematic diagrams showing the pillow adjustment structure of the safety seat according to an embodiment of this disclosure. As shown in FIGS. 5A to 5C, the pillow adjustment structure 91 comprises an adjusting handle 911, a stop member 912, a moving member 913, a restrict portion 914 (a fourth restrict portion), a connecting member 915, and an elastic member 916. As shown in FIG. 5B, the moving member 913 comprises a plurality of recesses U2. In order to adjust the position of the pillow, the user can pull the adjusting handle 911 for correspondingly moving the connecting member 915 in a fifth direction D5. Then, the restrict portion 914 can be moved in the restrict slot U1 (a fourth restrict slot), thereby forcing the stop member 912 to move in the sixth direction D6 and leave the recess U2 of the moving member 913 (see FIG. 5C). Afterwards, the user can move the moving member 913 to adjust the position of the pillow. After the pillow is moved to a proper new position, the user releases the adjusting handle 911, and the elastic member 916 applies an elastic force to push the connecting member 915 as well as the restrict portion 914 back, thereby pushing the stop member 912 into another recess U2 for holding the position of the pillow.

Figure 6A:
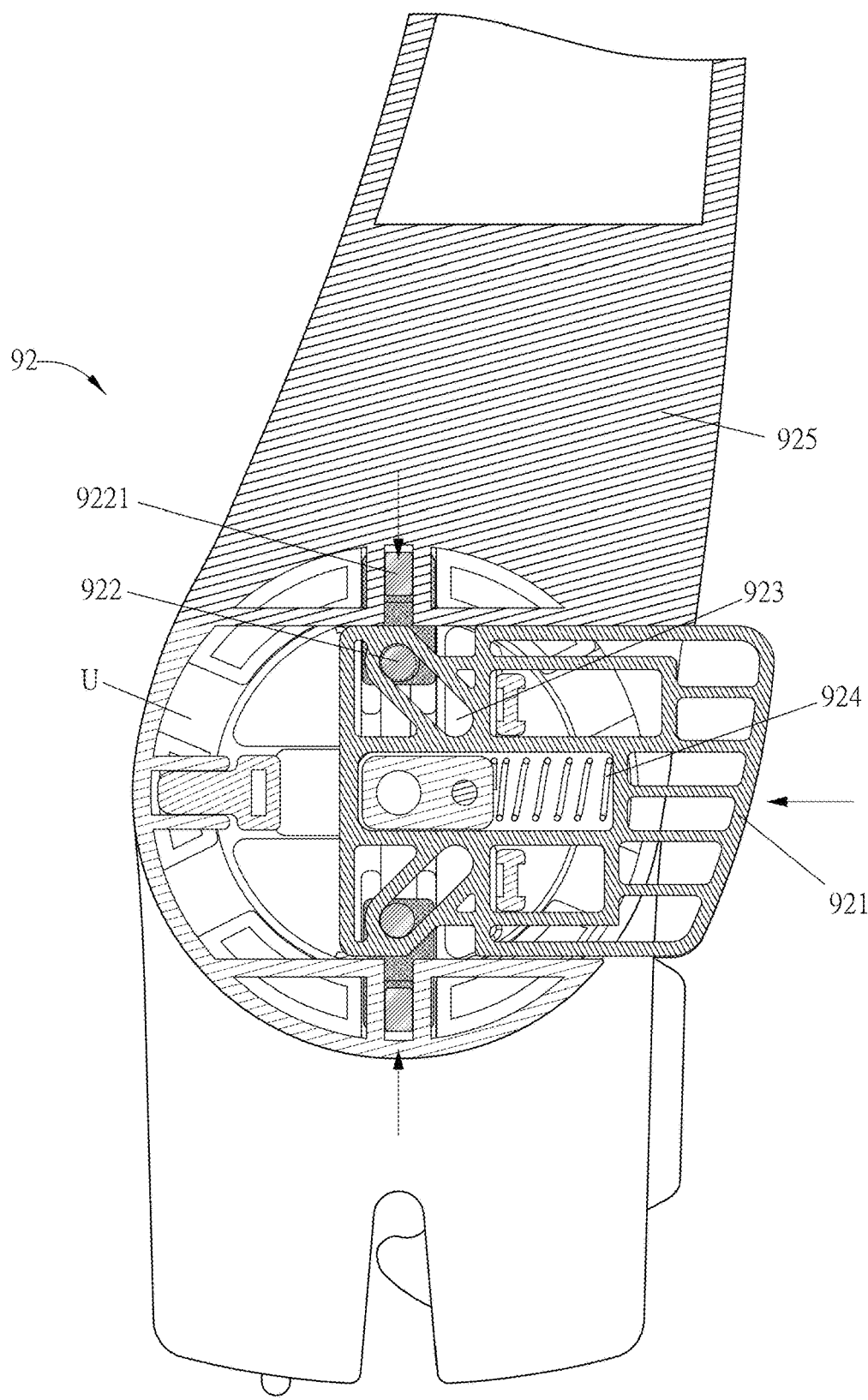
FIGS. 6A and 6B are schematic diagrams showing the handlebar adjustment structure of the safety seat according to an embodiment of this disclosure.
Figure 6B:
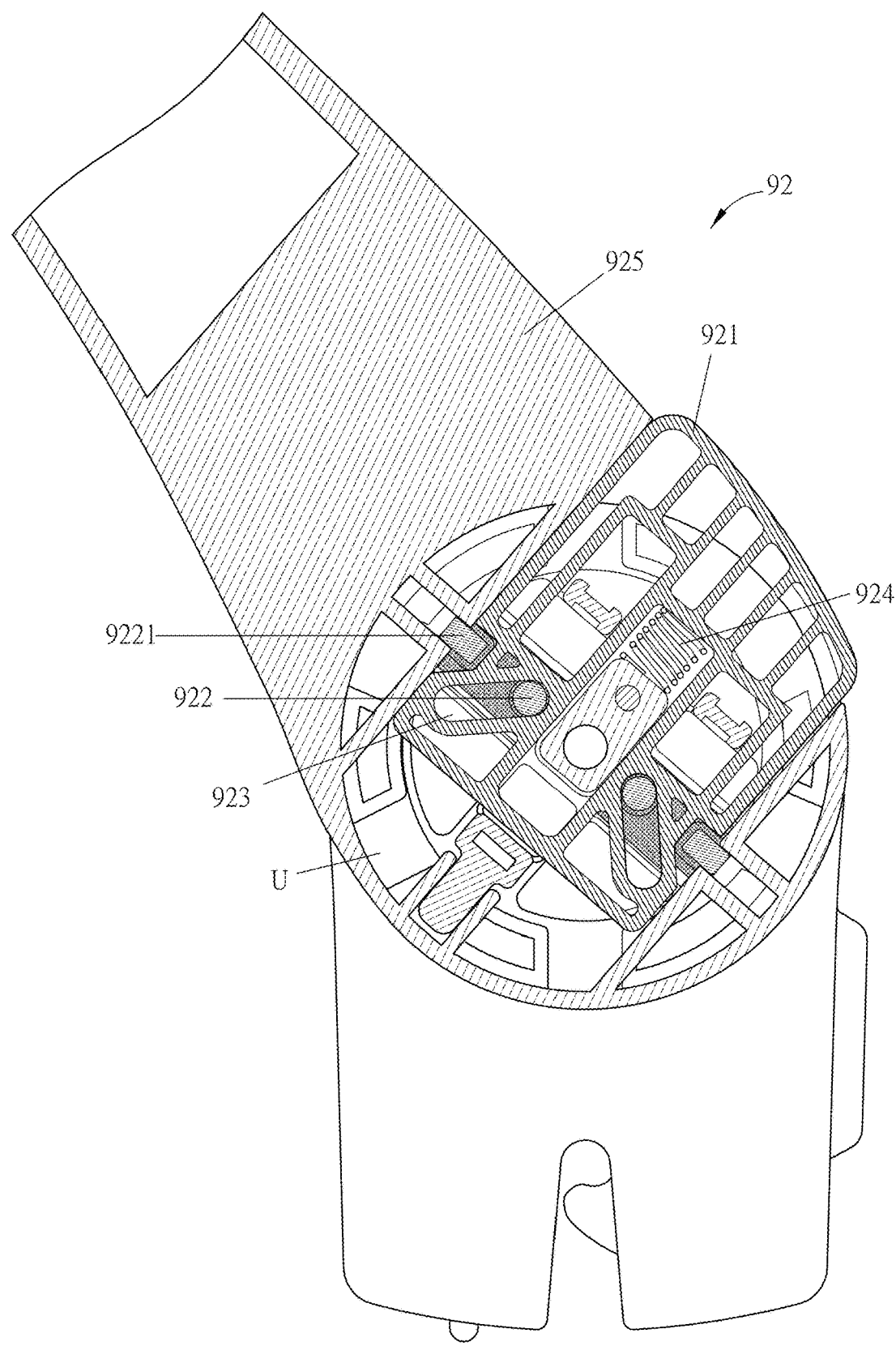

FIGS. 6A and 6B are schematic diagrams showing the handlebar adjustment structure of the safety seat according to an embodiment of this disclosure. The handlebar adjustment structure 92 comprises an adjusting member 921, a restrict portion 922 (a fifth restrict portion), a restrict slot 923 (a fifth restrict slot), an elastic member 924, and a handlebar 925. The restrict portion 922 comprises at least one protruding portion 9221, which is located corresponding to the recess U. In other words, the restrict portion 922 and the protruding portion 9221 can be referred to an integrated piece of component, so that the protruding portion 9221 will be moved or rotated while the restrict portion 922 is moved or rotated. As shown in FIG. 6A, in order to adjust the position of the handlebar 925, the user can press the adjusting member 921, so the restrict portion 922 and the protruding portion 9221 will be moved downwardly due to the configuration of the restrict slot 923, and the protruding portion 9221 will leave the recess U (FIG. 6B). In this status, the user can rotate the handlebar 925 for adjusting the position of the handlebar 925. After the handlebar 925 reaches a proper new position, the user can release the adjusting member 921, and the elastic member 924 can apply an elastic force to move the adjusting member 921 back, thereby correspondingly moving the restrict portion 922 and the protruding portion 9221 back. Thus, the protruding portion 9221 will insert into another recess U for holding the position of the handlebar 925.

Figure 7A:
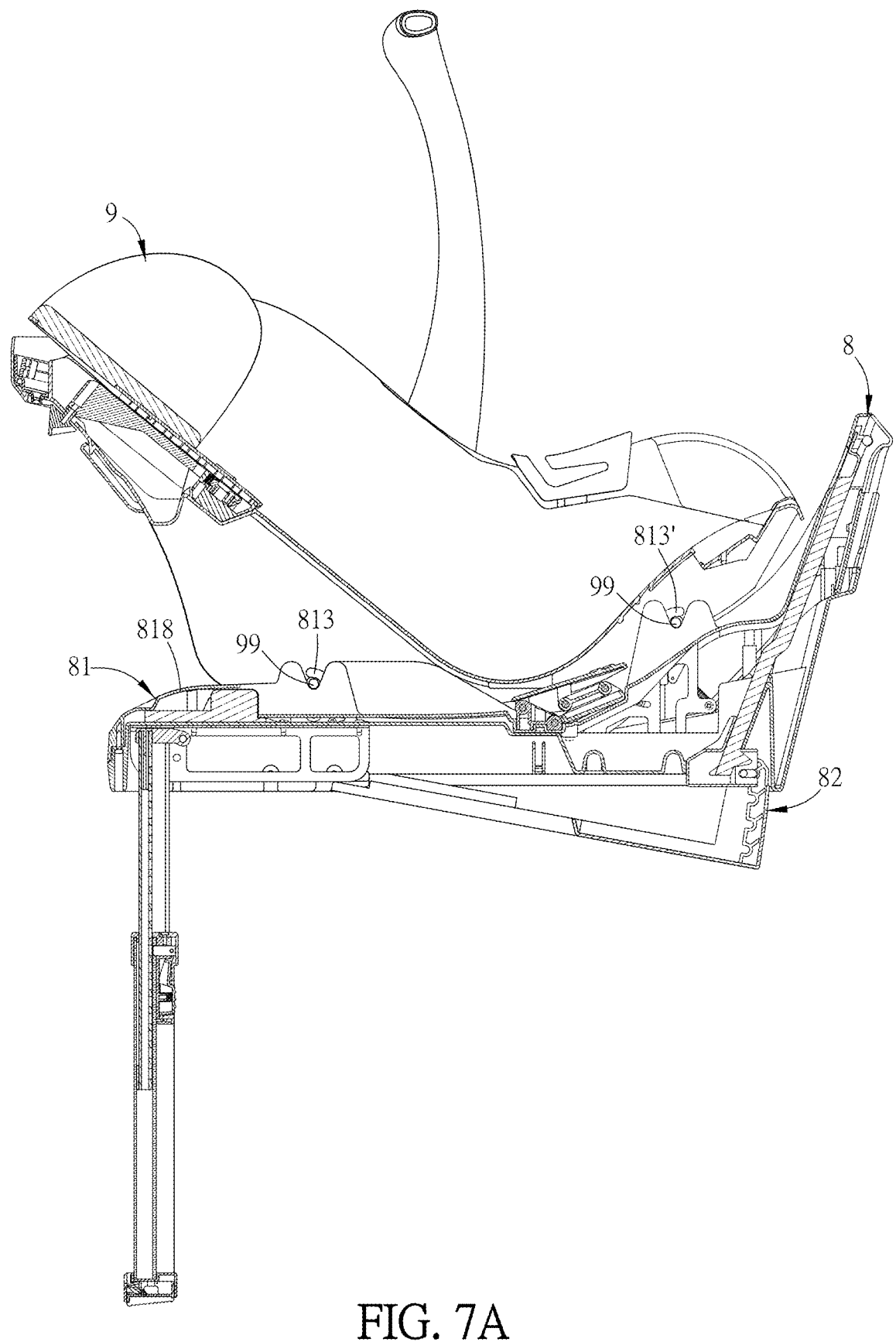
FIG. 7A is a schematic diagram showing an assembling procedure of the safety seat and the base according to an embodiment of this disclosure.
Figure 7B:
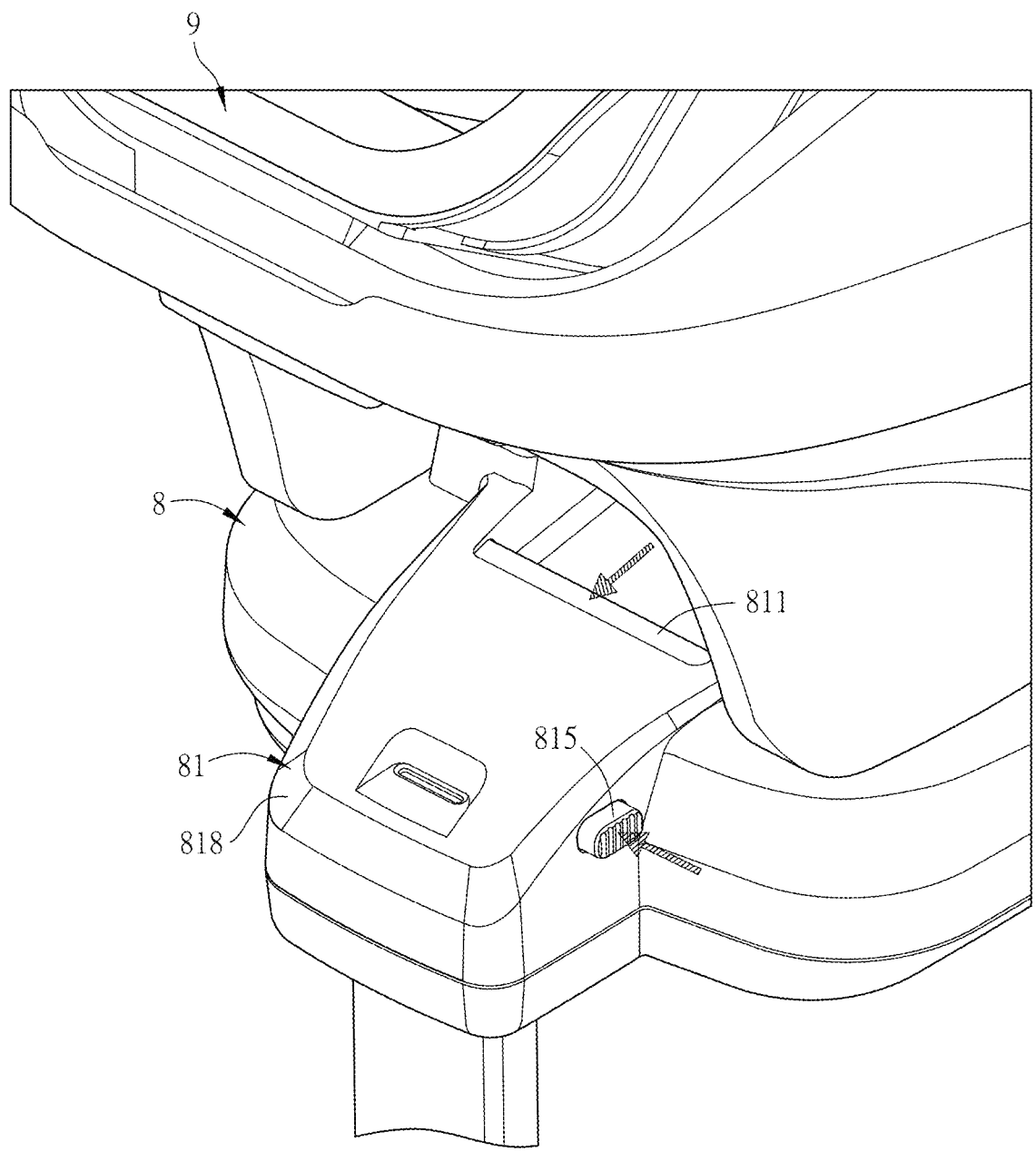
FIG. 7B is an partial enlarged view showing the assembling procedure of the safety seat and the base according to an embodiment of this disclosure.
Figure 7C:
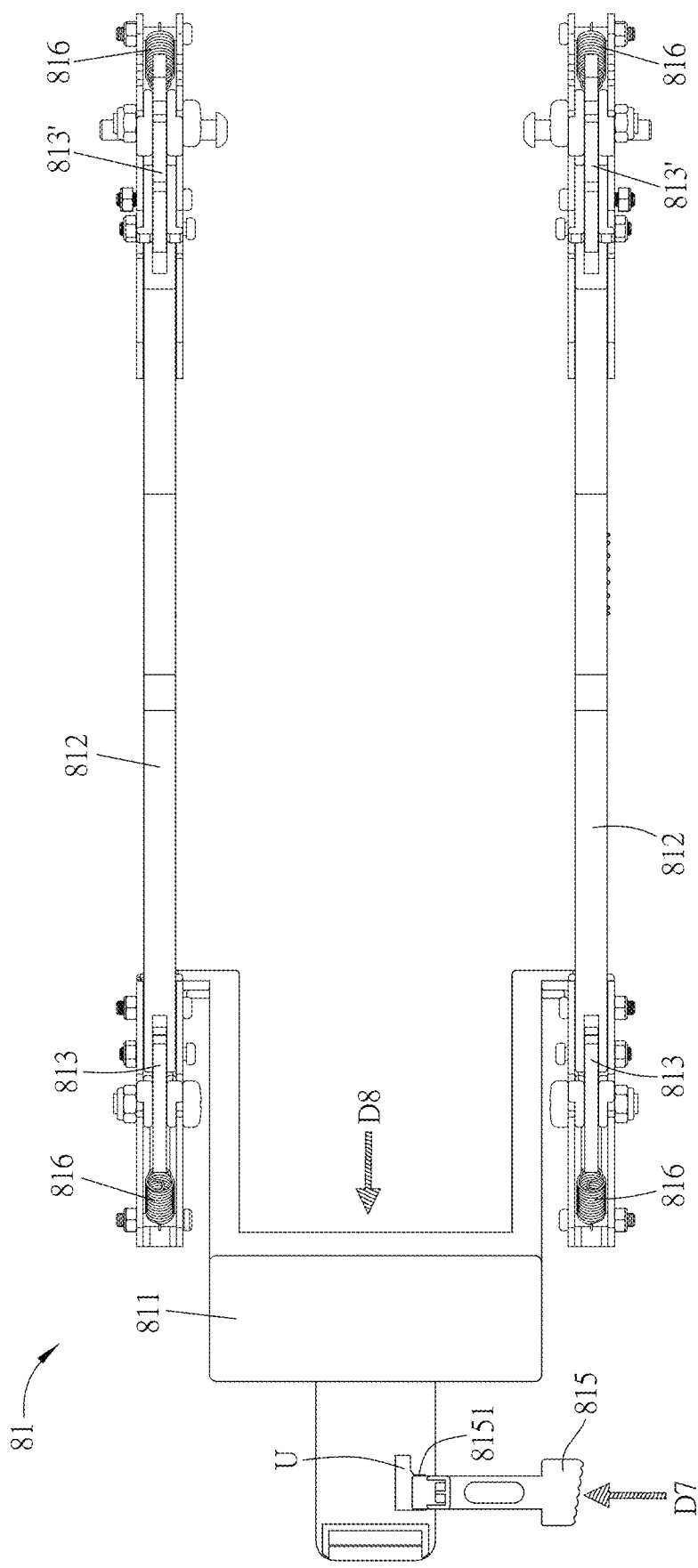
FIGS. 7C and 7D are top views of the locking mechanism of the base according to an embodiment of this disclosure.
Figure 7D:
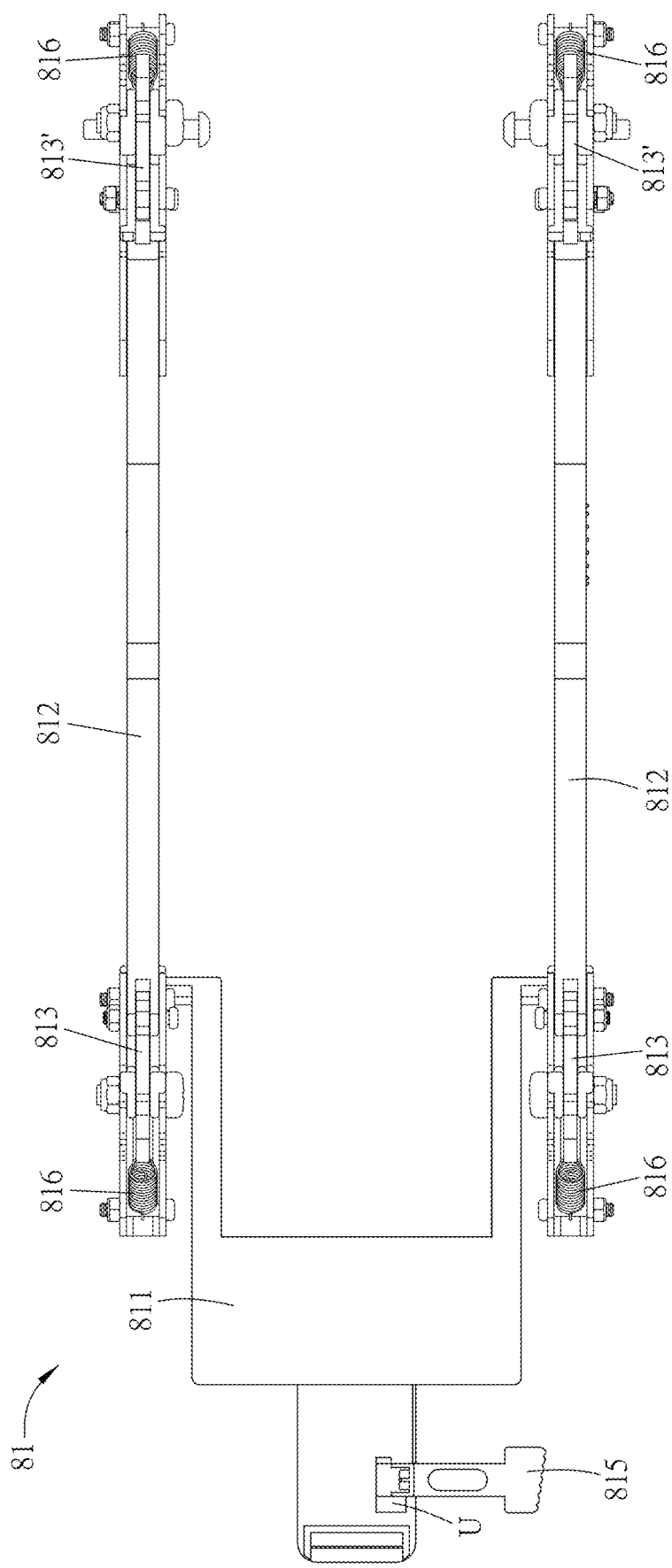
Figure 7E:
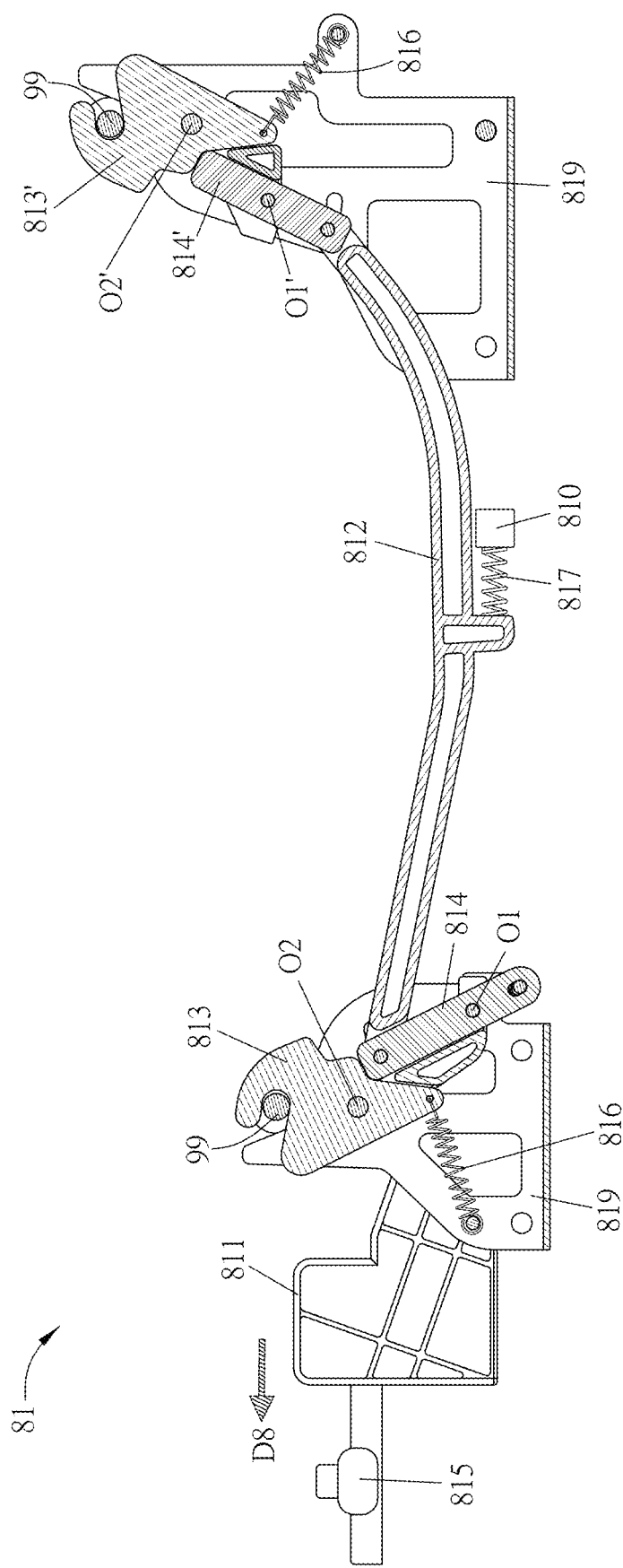
FIGS. 7E and 7F are lateral views of the locking mechanism of the base according to an embodiment of this disclosure.
Figure 7F:
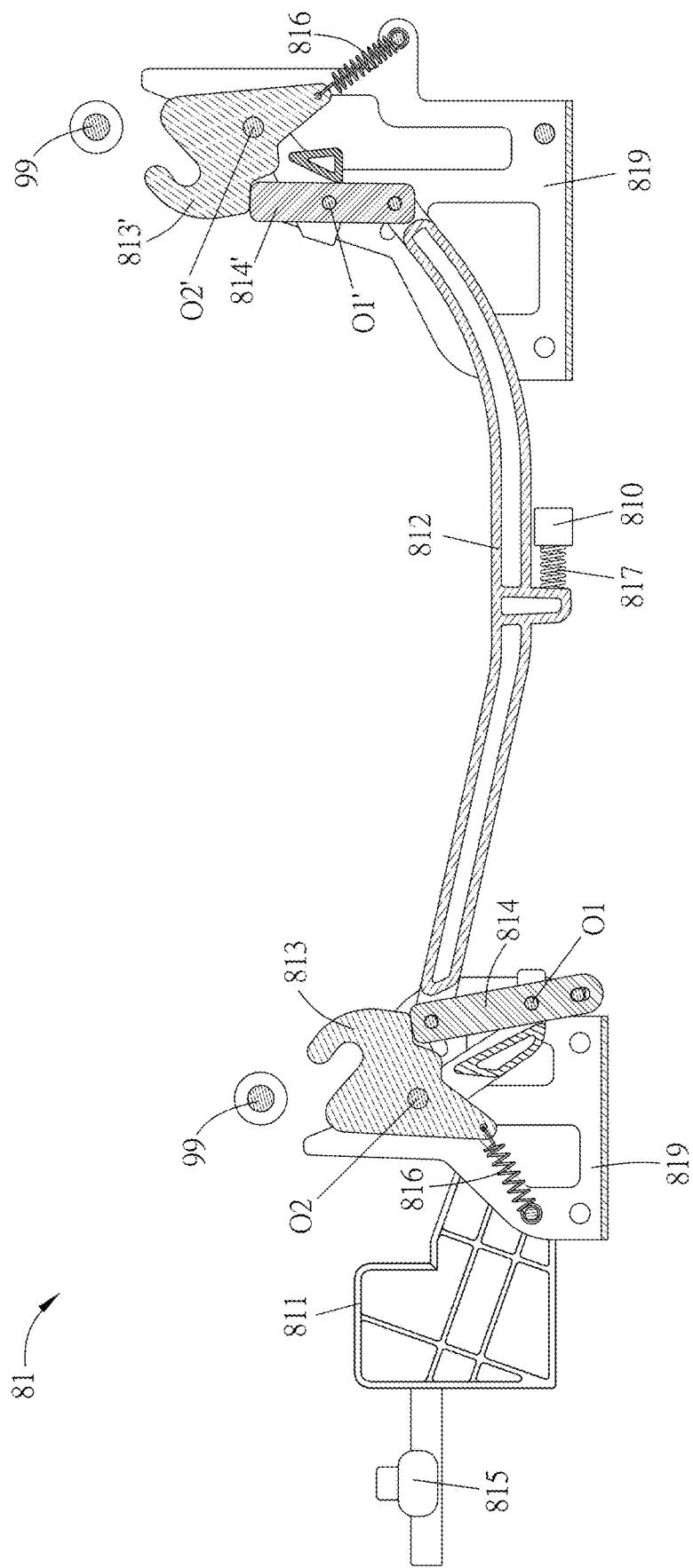

FIG. 7A is a schematic diagram showing an assembling procedure of the safety seat and the base according to an embodiment of this disclosure, FIG. 7B is an partial enlarged view showing the assembling procedure of the safety seat and the base according to an embodiment of this disclosure, FIGS. 7C and 7D are top views of the locking mechanism of the base according to an embodiment of this disclosure, and FIGS. 7E and 7F are lateral views of the locking mechanism of the base according to an embodiment of this disclosure.

As shown in FIGS. 7A and 7B, the safety seat 9 is installed on the base 8 by fastening two fixing rods 99 in the fixing members 813 and 813' of the base 8. The two fixing rods 99 are disposed at two sides of the bottom portion of the safety seat 9. In addition, the base 8 comprises a locking mechanism 81, which comprises a first releasing member 815 and a second releasing member 811 for unlocking the fixing members 813 and 813', so that the safety seat 9 can be detached from the base 8. Specifically, in order to detach the safety seat 9 from the base 8, the user can press the first releasing member 815 and the second releasing member 811 for unlocking the fixing members 813 and 813' and thus releasing the fixing rods 99. Then, the user can lift the safety seat 9 to detach the safety seat 9 from the base 8.

As shown in FIGS. 7C to 7F, the locking mechanism 81 comprises a first releasing member 815, a second releasing member 811, two fixing members 813, and two fixing members 813' (see FIGS. 7C and 7D). In addition, the locking mechanism 81 further comprises two linking rods 812, two connecting members 814 (at left side of FIG. 7E), two connecting members 814' (at right side of FIG. 7E), four first elastic members 816, and two second elastic members 817. The first releasing member 815, the second releasing member 811, the linking rods 812, the fixing members 813 and 813', the connecting members 814 and 814', the first elastic members 816, and the second elastic members 817 are all accommodated in the housing 818 (FIG. 7B). One fixing member 813, one fixing member 813', one connecting member 814, one connecting member 814', two first elastic members 816, and one second elastic member 817 can be combined to form one locking assembly, and the other one fixing member 813, the other one fixing member 813', the other one connecting member 814, the other one connecting member 814', the other two first elastic members 816, and the other one second elastic member 817 can be combined to form another locking assembly. Thus, the locking mechanism 81 comprises totally two locking assemblies, which are arranged in parallel.

As shown in FIGS. 7C and 7D, one end of the second releasing member 811 away from the fixing member 813 is configured with a recess U, and a part of the first releasing member 815 is disposed in the recess U while another part thereof is located out of the recess U. When the first releasing member 815 moves in the seventh direction D7, the second releasing member 811 can move in the eighth direction D8. The seventh direction D7 is perpendicular to the eighth direction D8. The configuration of the recess U of the second releasing member 811 can restrict the movement of the first releasing member 815 and the second releasing member 811. As shown in FIGS. 7E and 7F, the second releasing member 811 is connected to the left connecting member 814. One end of the connecting member 814 contacts against the fixing member 813, and two ends of the linking rod 812 are connected to the connecting members 814 and 814', respectively. In addition, one end of the first elastic member 816 is connected to the chassis 819, and the other end thereof is connected to fixing member 813. One end of the other first elastic member 816 is connected to the chassis 819, and the other end thereof is connected to fixing member 813'. Moreover, one end of the second elastic member 817 is connected to the linking rod 812, and the other end thereof is fixed to the stop member 810.

Referring to FIG. 7C again, when the first releasing member 815 is not pressed and is not moved in the direction toward the second releasing member 811 (the seventh direction D7), the second releasing member 811 cannot be moved in the eighth direction D8 because the side surface 8151 of the first releasing member 815 contacts against the side wall of the recess U. As shown in FIG. 7D, when the first releasing member 815 moves in the direction toward the second releasing member 811 (the seventh direction D7), the second releasing member 811 can be moved in the eighth direction D8. Accordingly, the connecting member 814 can be correspondingly moved, and then the fixing members 813 and 813' can be rotated about the rotation axis O2 and O2', respectively, through the first elastic member 816. Afterwards, the fixing members 813 and 813' can release the fixing rods 99, and the user can lift the safety seat 9.

Referring to FIGS. 7E and 7F, in the locking status, the fixing rods 99 are hooked by the fixing members 813 and 813', respectively, and the first elastic member 816 is pulled and extended. Meanwhile, the elastic force of the second elastic member 817 can be applied to the connecting rod 812 for moving the connecting rod 812 in the eighth direction D8, thereby allowing one end of the connecting member 814 to contact against the fixing member 813 and allowing one end of the connecting member 814' to contact against the fixing member 813'. When pressing the first releasing member 815 and the second releasing member 811 sequentially, the second releasing member 811 can drive the left connecting member 814 to rotate about the rotation axis O1 in the clockwise direction, and the linking rod 812 can drive the right connecting member 814' to rotate about the rotation axis O1' in the counterclockwise direction, thereby releasing the two fixing rods 99. After the two fixing rods 99 are detached from the fixing members 813 and 813', respectively, and the user releases the second releasing member 811, the linking rod 812 can be pushed by the elastic force of the second elastic member 817 and move back to the left side (the eighth direction D8). Afterwards, one end of the connecting member 814 contacts against another position of the fixing member 813, one end of the connecting member 814' contacts against another position of the fixing member 813'.

In this embodiment, only the two releasing switches (the first releasing member 815 and the second releasing member 811) are pressed, the safety seat 9 can be detached from the base 8. This mechanism can prevent the risk and danger caused by the detachment of the safety seat 9 and the base 8, which may happen, for example, when the kid accidentally touches the second releasing member 811 (or the first releasing member 815). Accordingly, the first releasing member 815 can be named as a safety switch or a secondary locking switch.

Figure 8B:
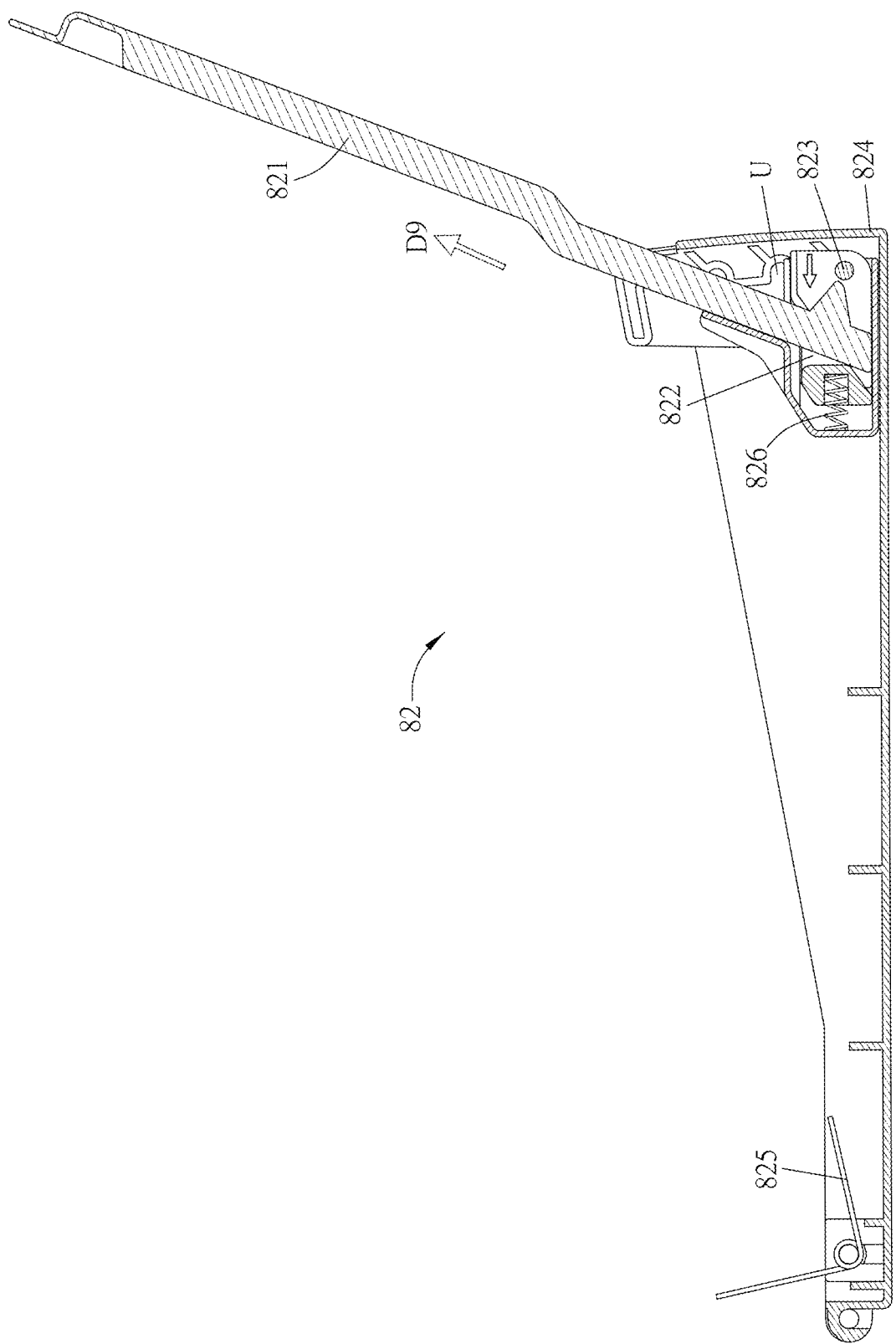

FIGS. 8A and 8B are schematic diagrams showing the angle adjustment mechanism of the base according to an embodiment of this disclosure. The angle adjustment mechanism 82 comprises an adjusting member 821, a linking member 822, a fixing rod 823, a chassis 824, and two elastic members 825 and 826. The side wall of the chassis 824 is configured with a plurality of recesses U, and the fixing rod 823 is disposed corresponding to one of the recesses U. As shown in FIG. 8A, in order to adjust the angle of the chassis 824, the user can pull the adjusting member 821 to move in the ninth direction D9 (see FIG. 8B). Then, the slant surface of the adjusting member 821 is moved accordingly, and the linking member 822 will be pushed to move in the tenth direction D10 (FIG. 8A), thereby moving the fixing rod 823 out of the recess U. Meanwhile, the elastic member 825 can apply the elastic force to make the chassis 824 reach the maximum angle (FIG. 8A), and the user can press on the bottom of the chassis 824 to rotate the chassis 824 in the direction toward the adjusting member 821 (the user needs to continuously pull the adjusting member 821). When the user releases the adjusting member 821, the elastic force of the elastic member 826 can move the linking member 822 in the direction opposite to the tenth direction D10. When the adjusting member 821 is not moved in the ninth direction D9 and moves back, the fixing rod 823 can be pushed back and inserted into another recess U, thereby holding the angle of the chassis 824.

Figure 9A:
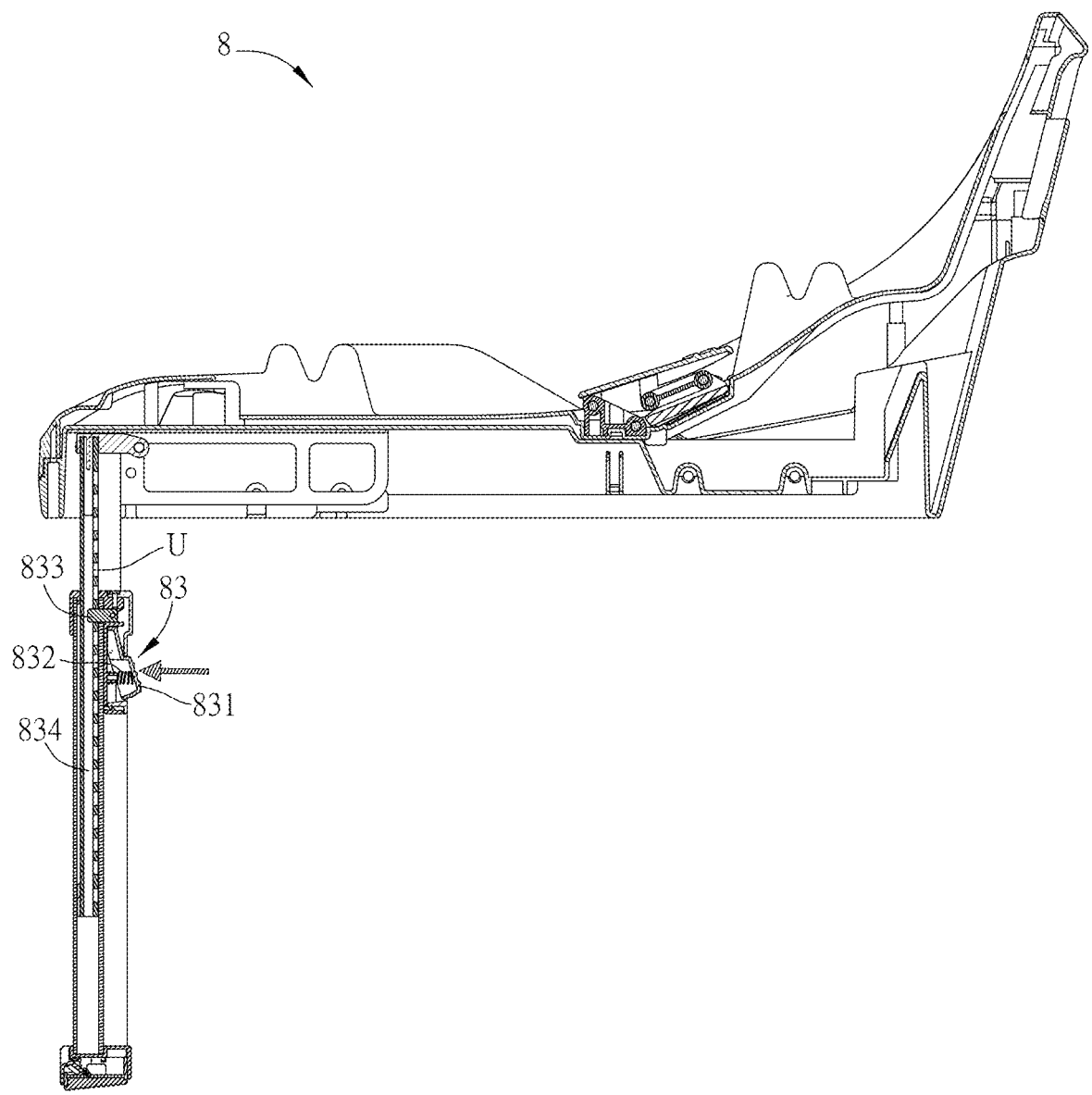
FIGS. 9A and 9B are schematic diagrams showing the stand adjustment mechanism of the base according to an embodiment of this disclosure.
Figure 9B:
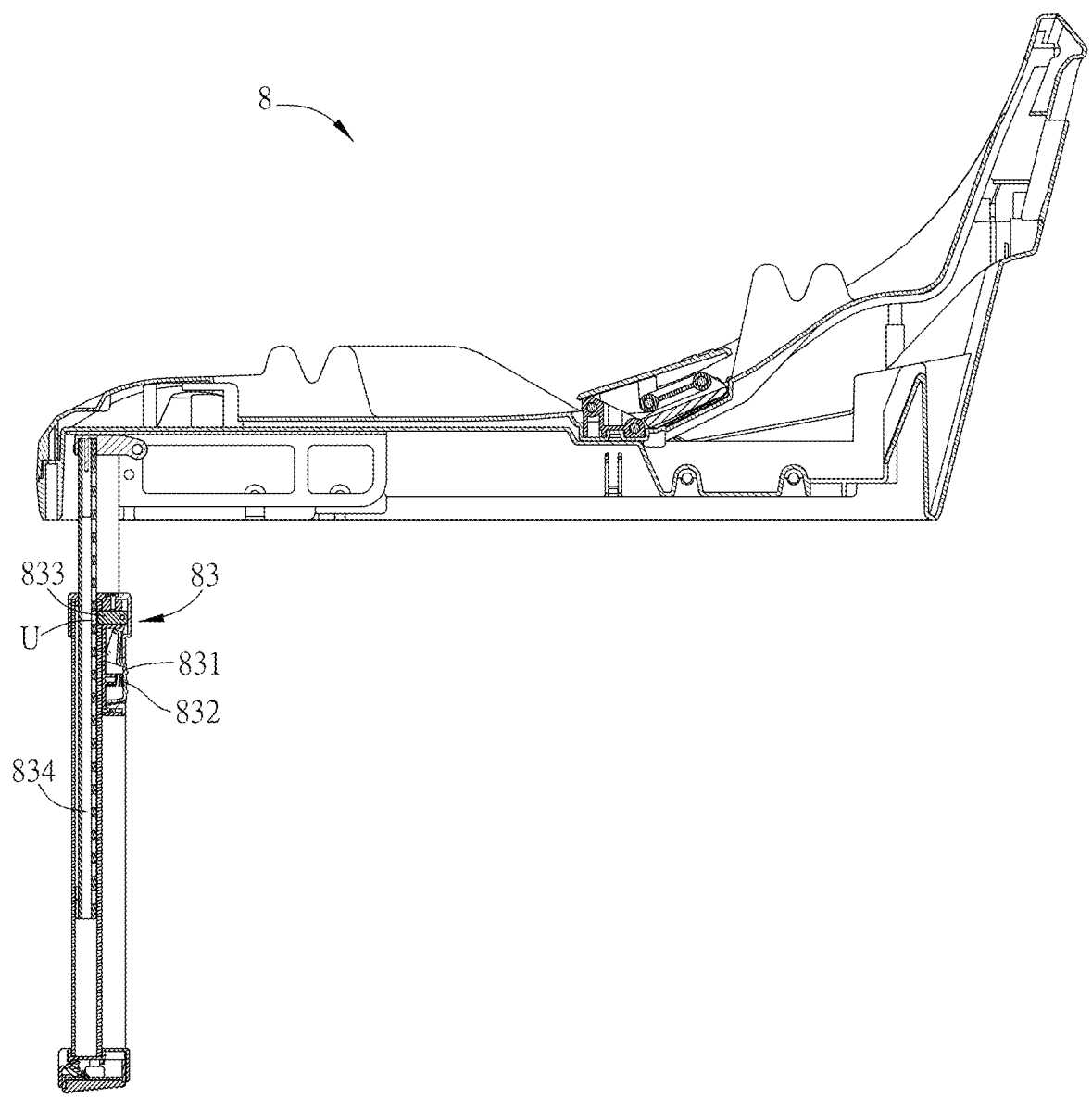

FIGS. 9A and 9B are schematic diagrams showing the stand adjustment mechanism of the base according to an embodiment of this disclosure. The stand adjustment mechanism 83 comprises an adjusting member 831, an elastic member 832, a stop member 833, and a supporting stand 834. The supporting stand 834 is configured with a plurality of recesses U, and the stop member 833 is disposed corresponding to one of the recesses U. As shown in FIG. 9A, in order to adjust the length of the supporting stand 834, the user can press the adjusting member 831, and the stop member 833 can be correspondingly moved to leave the recess U (FIG. 9B). Then, the user can adjust the length of the supporting stand 834. After adjusting member 831 is released, the elastic force of the elastic member 832 can push the adjusting member 831 back, so that the stop member 833 can be inserted into another recess U for holding the position of the supporting stand 834.

Figure 10A:
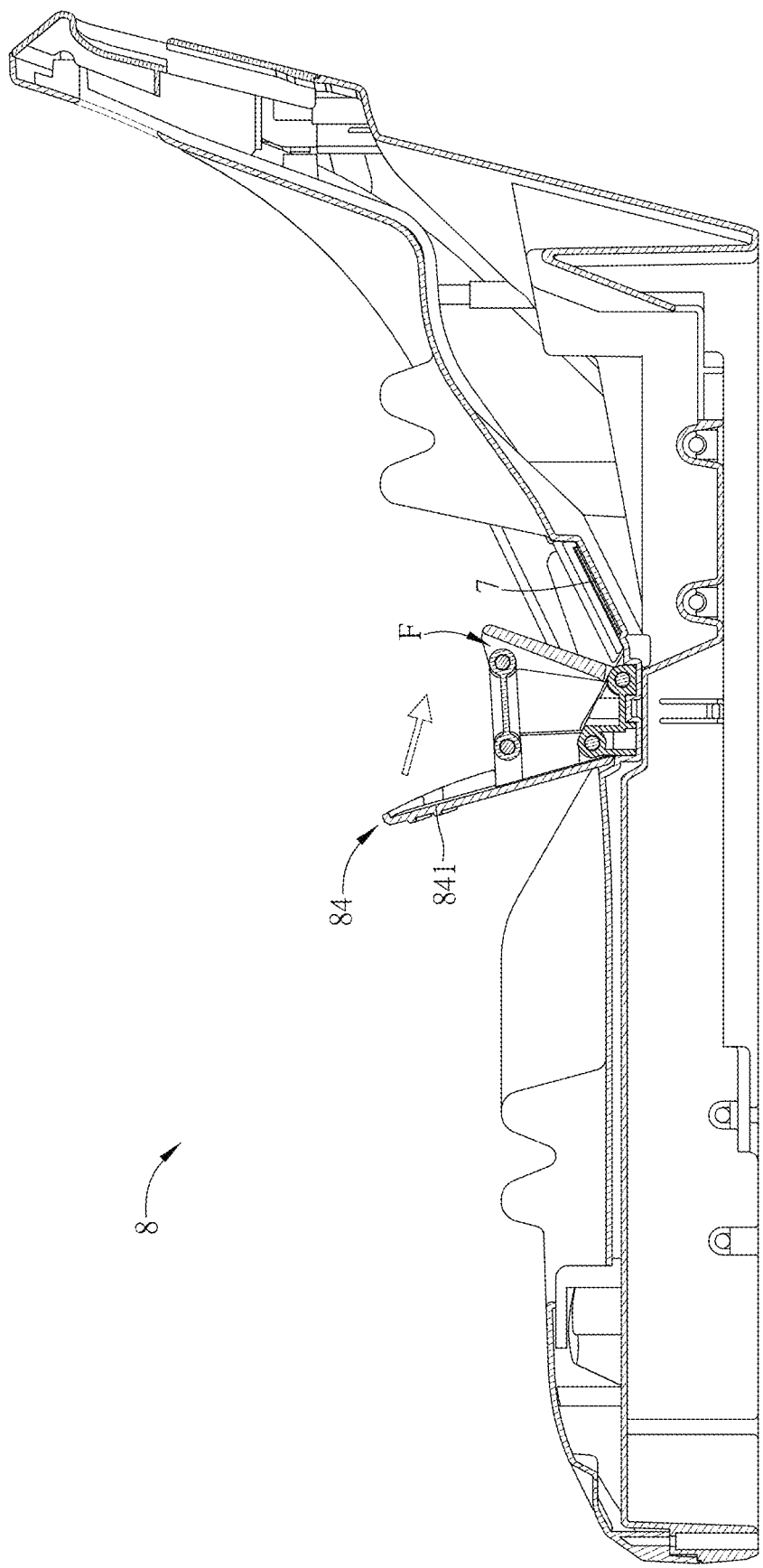
FIGS. 10A and 10B are schematic diagrams showing the seat-belt locking mechanism of the base according to an embodiment of this disclosure.
Figure 10B:
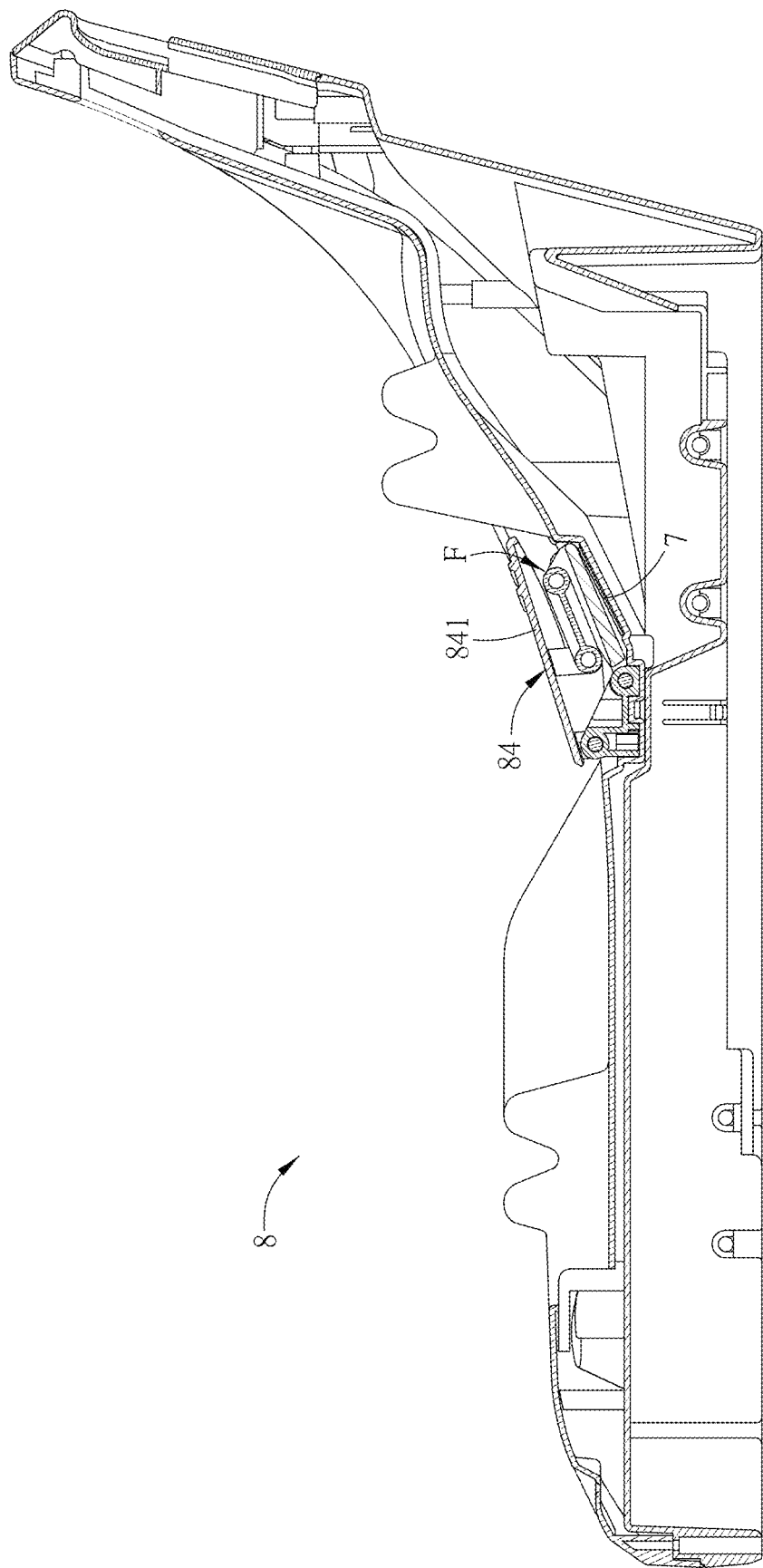

FIGS. 10A and 10B are schematic diagrams showing the seat-belt locking mechanism of the base according to an embodiment of this disclosure. The seat-belt locking mechanism 84 comprises a fixing member 841, which correspondingly controls the operation of a four-linking-rod structure F. As shown in FIG. 10A, after the seat belt 7 is placed in the seat-belt locking mechanism 84, the user can press the fixing member 841, and the fixing member 841 can enable the operation of the four-linking-rod structure F for tightly fastening the seat belt 7. Accordingly, the seat belt 7 can be firmly fixed.

In summary, in the unlocking device with a pause function of this disclosure, the first moving member is disposed on the releasing member and comprises a first protruding portion, the second moving member is disposed corresponding to the first moving member and comprises a second protruding portion disposed cooperated with the first protruding portion, and the third moving member is connected to the second moving member. When the fourth end portion of the third moving member contacts the carry body, and the first end portion of the releasing member moves along a first direction towards the housing, the releasing member drives the first moving member to move in the first direction, so that the second moving member holds a position of the releasing member by the second protruding portion and the first protruding portion. Accordingly, when the unlocking device is applied to, for example, a baby safety seat, the unlocking device can provide a pause function after the releasing member is pressed. Therefore, the user does not need to press the releasing members at two sides by two hands while lifting the baby safety seat at the same time, thereby improving the utility convenience.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An unlocking device with a pause function cooperated with a carry body, wherein the carry body comprises a fixing rod, the unlocking device comprising:
 a housing;
 a releasing member disposed in the housing, wherein the releasing member comprises a first end portion and a second end portion;
 a first moving member disposed on the releasing member, wherein the first moving member comprises a first protruding portion;
 a second moving member disposed in the housing and disposed corresponding to the first moving member, wherein the second moving member comprises a second protruding portion, and the second protruding portion is disposed cooperated with the first protruding portion;
 a third moving member disposed in the housing, wherein the third moving member comprises a third end portion and a fourth end portion, and the third end portion is connected to the second moving member; and
 a locking member disposed in the housing and disposed corresponding to the fixing rod, wherein the second end portion of the releasing member is connected to the locking member;
 wherein, when the fourth end portion of the third moving member contacts the carry body, and the releasing member is pressed to make the first end portion of the releasing member move along a first direction towards the housing, the releasing member drives the first moving member to move in the first direction, the second end portion of the releasing member drives the locking member to rotate and to be detached from the fixing rod, and the third moving member carries the second moving member to move in a direction opposite to a second direction, so that the second moving member holds a position of the releasing member by the second protruding portion and the first protruding portion.

2. The unlocking device of claim 1, wherein the locking member comprises a slant surface facing toward the fixing rod and disposed corresponding to the fixing rod.

3. The unlocking device of claim 1, wherein the locking member comprises a restrict slot, the release member has a restrict portion disposed at the second end portion, and the restrict portion is located in the restrict slot.

4. The unlocking device of claim 3, wherein when the releasing member moves, the locking member is moved correspondingly through the restrict slot and the restrict portion so as to detach the locking member from the fixing rod.

5. The unlocking device of claim 1, wherein each of the first protruding portion and the second protruding portion has a triangular structure.

6. The unlocking device of claim 1, wherein the first protruding portion has a first slant surface, the second protruding portion has a second slant surface, and the first slant surface faces toward the second slant surface.

7. The unlocking device of claim 1, further comprising:
 a first elastic member, wherein the releasing member further comprises a recess, the first moving member and the first elastic member are disposed in the recess, one end of the first elastic member contacts the first moving member, and another end of the first elastic member contacts a side wall of the recess.

8. The unlocking device of claim 7, wherein when the release member moves along the first direction, the first elastic member drives the first moving member to move, so that the first protruding portion engages with the second protruding portion.

9. The unlocking device of claim 7, wherein the first elastic member drives the first moving member to move in the second direction, and the second direction is perpendicular to the first direction.

10. The unlocking device of claim 1, wherein the second moving member further comprises a restrict slot, the third moving member has a restrict portion disposed at the third end portion, and the restrict portion is located in the restrict slot.

11. The unlocking device of claim 10, wherein the restrict portion limits a moving direction of the restrict slot, so that the moving direction of the second moving member is parallel to the second direction, and the second direction is parallel to the first direction.

12. The unlocking device of claim 1, further comprising:
a second elastic member disposed in the housing, wherein one end of the second elastic member contacts the third moving member.

13. The unlocking device of claim 12, wherein when the fourth end portion of the third moving member leaves the carry body, the second elastic member drives the third moving member to move along the first direction, so that the second protruding portion is detached from the first protruding portion, and the second direction is perpendicular to the first direction.

14. The unlocking device of claim 12, wherein when the fourth end portion of the third moving member does not contact the carry body, the fourth end portion protrudes from the housing through the second elastic member.

15. The unlocking device of claim 1, further comprising:
a third elastic member disposed in the housing, wherein one end of the third elastic member contacts the releasing member.

16. The unlocking device of claim 15, wherein when the fourth end portion of the third moving member is detached from the carry body, the third elastic member drives the releasing member in a direction opposite to the first direction.

17. The unlocking device of claim 1, further comprising:
a position indicating member disposed in the housing and connected to the releasing member, wherein when the releasing member moves, the position indicating member is moved correspondingly.

18. The unlocking device of claim 1, being applied to a baby safety seat, a baby cradle, a pet cradle, a shopping basket, a storage basket, or a storage box.

* * * * *